United States Patent
Black et al.

(10) Patent No.: US 9,213,861 B2
(45) Date of Patent: *Dec. 15, 2015

(54) MOBILE COMMUNICATION SYSTEM

(71) Applicants: Gerald R. Black, Southfield, MI (US);
Alyssa S. Black, Belmont, MI (US)

(72) Inventors: Gerald R. Black, Southfield, MI (US);
Alyssa S. Black, Belmont, MI (US)

(73) Assignee: Gerald R. Black, Southfield, MI (US)

( * ) Notice: Subject to any disclaimer, the term of this patent is extended or adjusted under 35 U.S.C. 154(b) by 176 days.

This patent is subject to a terminal disclaimer.

(21) Appl. No.: 13/905,290

(22) Filed: May 30, 2013

(65) Prior Publication Data

US 2013/0263284 A1  Oct. 3, 2013

Related U.S. Application Data

(63) Continuation of application No. 12/284,405, filed on Sep. 22, 2008, which is a continuation of application No. PCT/US2007/007288, filed on Mar. 20, 2007.

(60) Provisional application No. 60/877,998, filed on Dec. 29, 2006, provisional application No. 60/861,917, filed on Nov. 30, 2006, provisional application No.

(Continued)

(51) Int. Cl.
*H04M 1/66* (2006.01)
*G06F 21/62* (2013.01)
*H04M 1/05* (2006.01)
*H04M 1/60* (2006.01)

(52) U.S. Cl.
CPC ............. *G06F 21/6245* (2013.01); *H04M 1/05* (2013.01); *H04M 1/66* (2013.01); *H04M 1/6066* (2013.01); *H04M 2250/12* (2013.01); *H04M 2250/74* (2013.01)

(58) Field of Classification Search
CPC ..... H04W 12/00; H04W 12/02; H04W 12/06; H04W 12/08; H04W 12/10; H04W 12/12
USPC ......... 455/410, 411, 575.1, 575.2, 90.1, 90.2, 455/90.3
See application file for complete search history.

(56) References Cited

U.S. PATENT DOCUMENTS

2001/0017584 A1  8/2001  Shinzaki
2002/0073344 A1  6/2002  Maritzen et al.

(Continued)

*Primary Examiner* — Temica M Beamer
(74) *Attorney, Agent, or Firm* — Gerald R. Black, Esq.

(57) ABSTRACT

The mobile communication device is for use as a cell phone, as a wireless identity authentication device with other electronic devices (with cell phones, computers, and ATM's), and as a headset in the form of an earphone, an eye-covering, or a head covering for audio communication with a central processor, another mobile terminal a cell phone, or a pda. The mobile communication device is hands-free being worn on or near the face, and only requires a finger touching for bimodal identity authentication. An audio receiver is compatible with the ear of the user and a microphone transmits words spoken by the user, electronically therethrough. A fingerprint sensor is mounted and positioned within the device. When user authentication is required, the user is prompted to touch the fingerprint sensor, and said fingerprint data is compared with fingerprint images of authorized users. In another aspect of the invention, mobile communication device is an eye-covering, a head covering, or an identification badge including a fingerprint sensor and a processor and is used for wireless authentication of the user.

20 Claims, 30 Drawing Sheets

MOBILE COMMUNICATION DEVICE

Related U.S. Application Data

60/813,402, filed on Jun. 14, 2006, provisional application No. 60/801,634, filed on May 18, 2006, provisional application No. 60/792,571, filed on Apr. 16, 2006, provisional application No. 60/792,570, filed on Apr. 16, 2006, provisional application No. 60/788,084, filed on Mar. 28, 2006, provisional application No. 60/783,785, filed on Mar. 20, 2006.

(56) References Cited

U.S. PATENT DOCUMENTS

| | | |
|---|---|---|
| 2002/0186180 A1 | 12/2002 | Duda |
| 2003/0095525 A1 | 5/2003 | Lavin et al. |
| 2003/0115151 A1 | 6/2003 | Wheeler et al. |
| 2003/0174049 A1 | 9/2003 | Beigel et al. |
| 2003/0226041 A1 | 12/2003 | Palmer et al. |
| 2004/0263318 A1 | 12/2004 | Dvorak |
| 2005/0001028 A1 | 1/2005 | Zuili et al. |
| 2005/0277872 A1 | 12/2005 | Colby et al. |
| 2006/0007151 A1 | 1/2006 | Ram |
| 2006/0013446 A1 | 1/2006 | Stephens |
| 2006/0023158 A1 | 2/2006 | Howell et al. |
| 2006/0132382 A1 | 6/2006 | Jannard |
| 2006/0293891 A1 | 12/2006 | Pathuel |
| 2007/0028359 A1 | 2/2007 | Robinson et al. |
| 2007/0096870 A1 | 5/2007 | Fisher |
| 2007/0150415 A1 | 6/2007 | Bundy et al. |

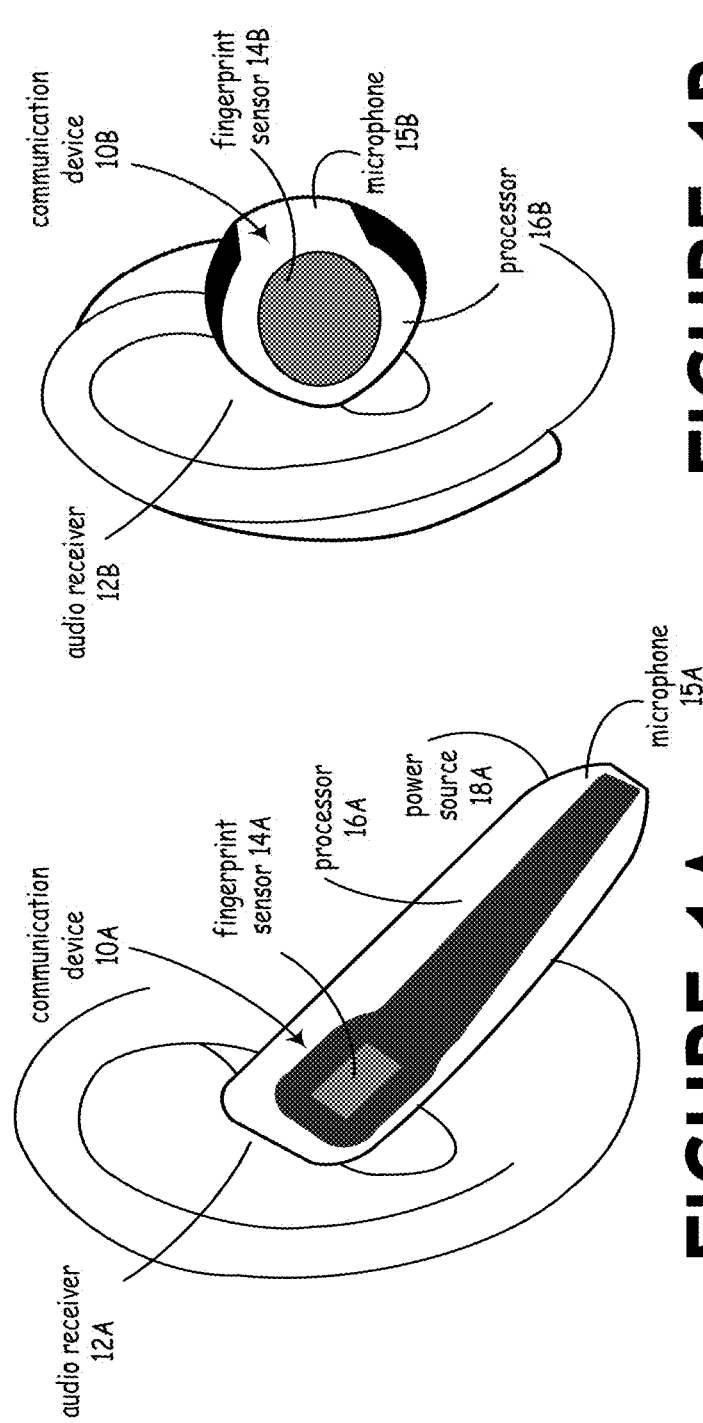

FIGURE 1C
EYE-COVERING COMMUNICATION DEVICE
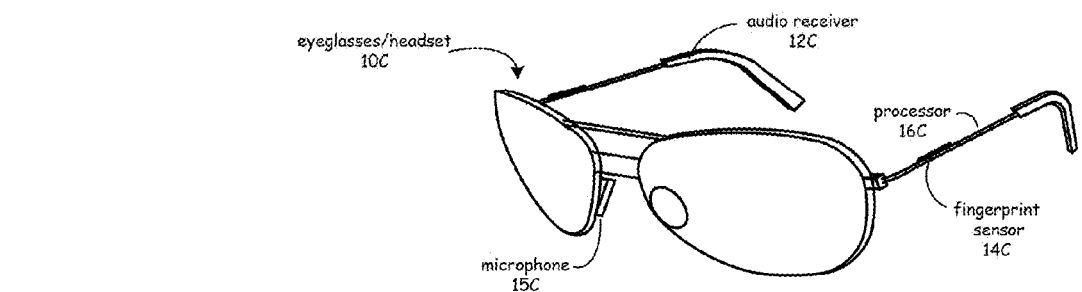
FIGURE 1D
EYE-COVERING COMMUNICATION DEVICE
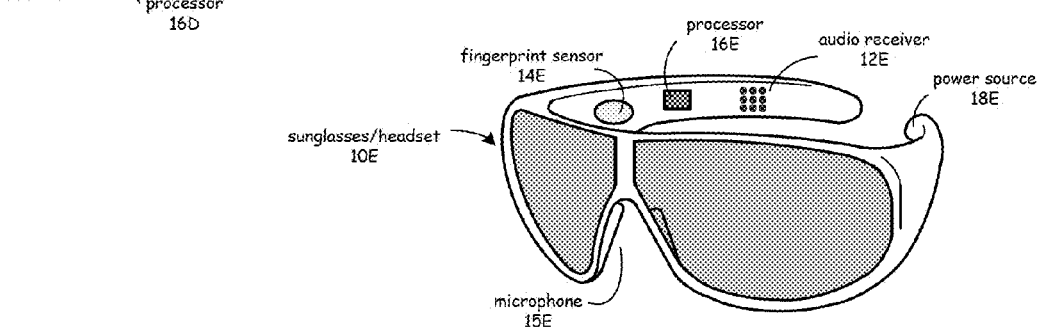
FIGURE 1E
EYE-COVERING COMMUNICATION DEVICE

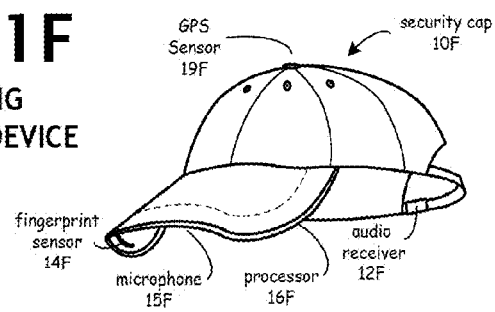
FIGURE 1F
HEAD-COVERING
COMMUNICATION DEVICE
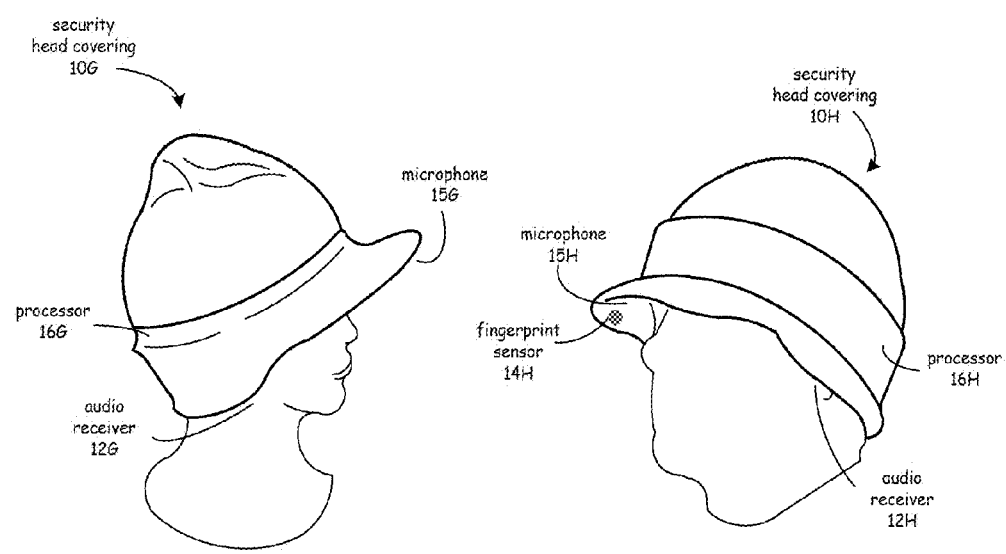
FIGURE 1G
HEAD-COVERING
COMMUNICATION DEVICE
FIGURE 1H
HEAD-COVERING
COMMUNICATION DEVICE

HEAD-COVERING
COMMUNICATION DEVICE

HEAD COVERING
COMMUNICATION DEVICE

HEAD-COVERING
COMMUNICATION DEVICE

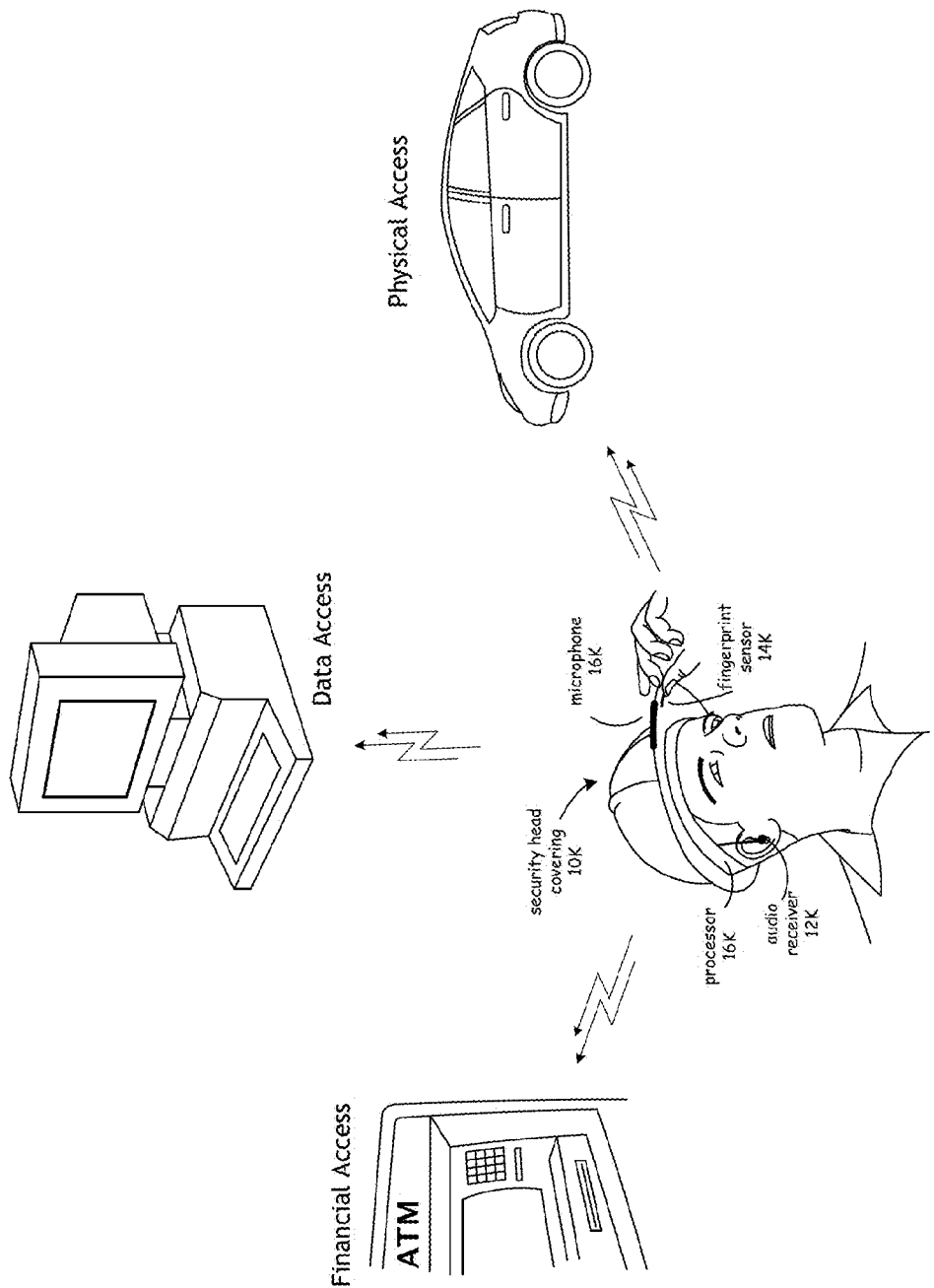

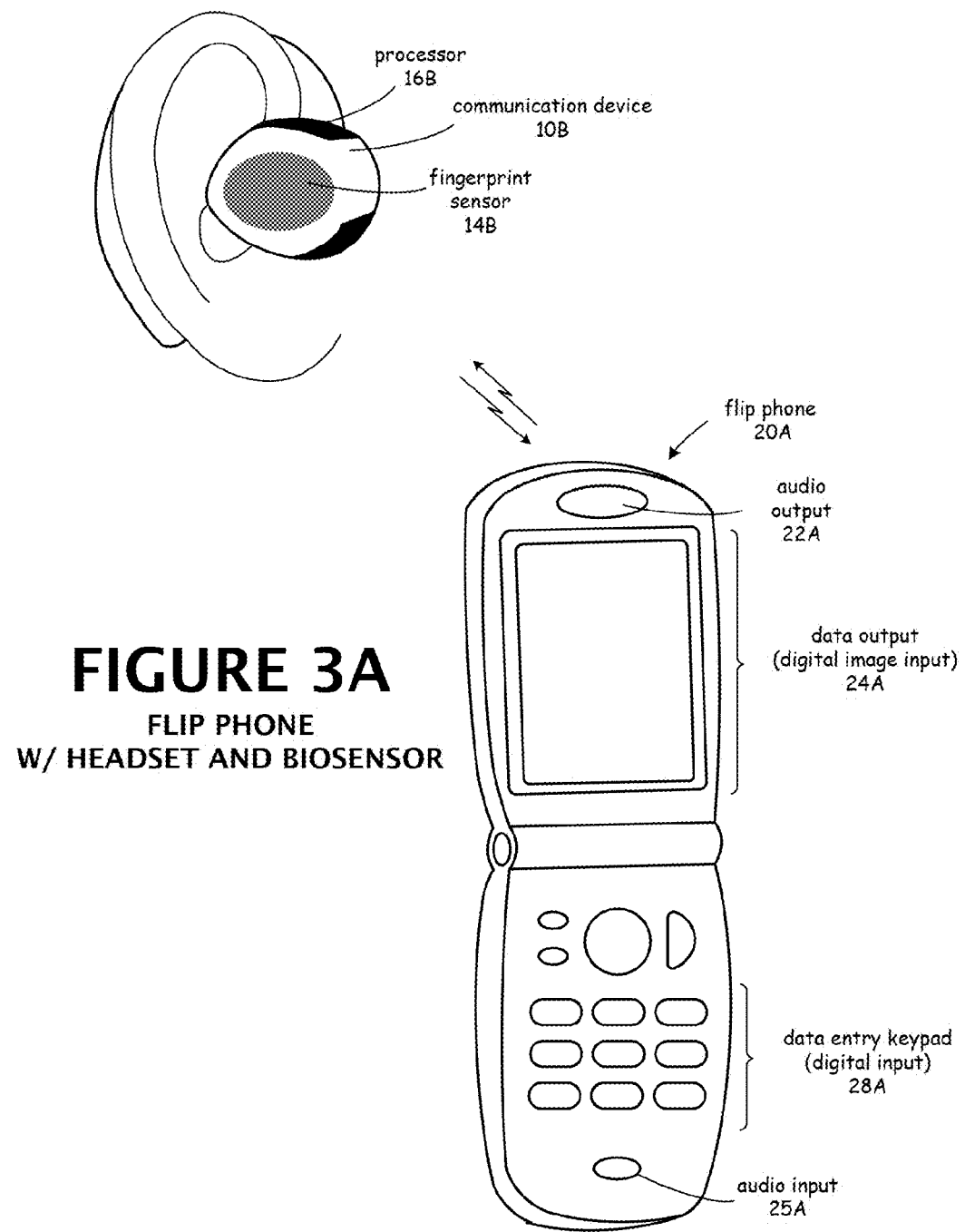

HANDHELD COMPUTER TERMINAL
W/ BLUETOOTH HEADSET
EYEGLASSES

EYE-COVERING COMMUNICATION DEVICE HAVING
SHORT-DISTANCE WIRELESS COMPATIBILITY
W/ PLURALITY OF COMMUNICATION DEVICES

HANDSET COMPATIBLE W/ PLURALITY OF DUAL-PURPOSE COMMUNICATION DEVICES

TERMINAL REGISTRATION

IDENTITY CONFIRMATION

WIRE TRANSFER

CURRENCY CONVERSION

POS PAYMENT PROCESSING

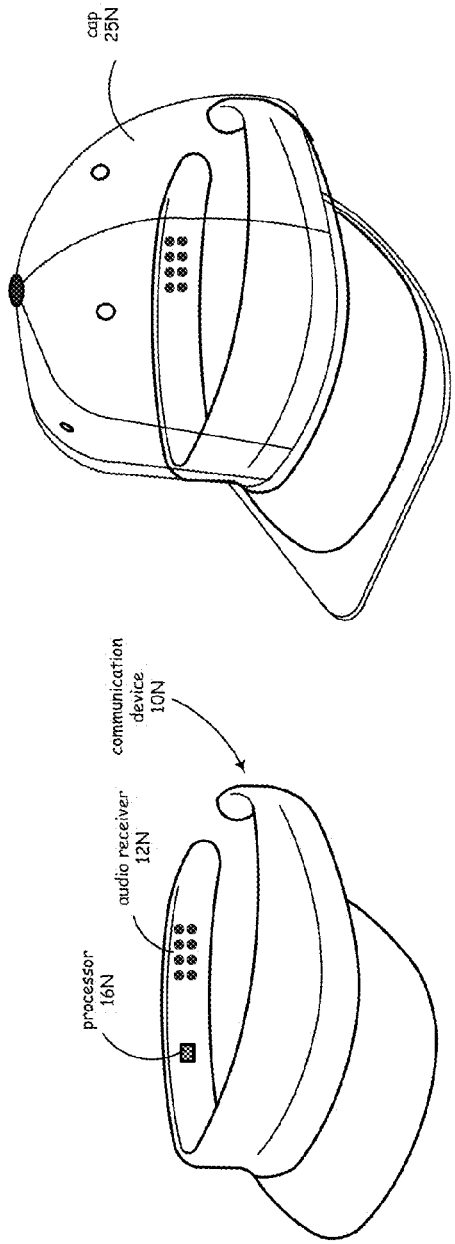
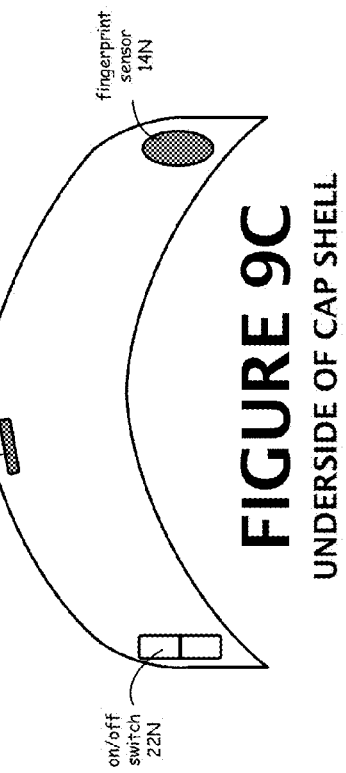
FIGURE 9A
COMMUNICATION DEVICE CAP SHELL
FIGURE 9B
COMMUNICATION DEVICE CAP SHELL W/ CONVENTIONAL CAP
FIGURE 9C
UNDERSIDE OF CAP SHELL

GLASSES

GLASSES w/ WING
COMMUNICATION DEVICE

GLASSES w/ FRAME
COMMUNICATION DEVICE

GARAGE DOOR LOCK

CAR DOOR ENTRY

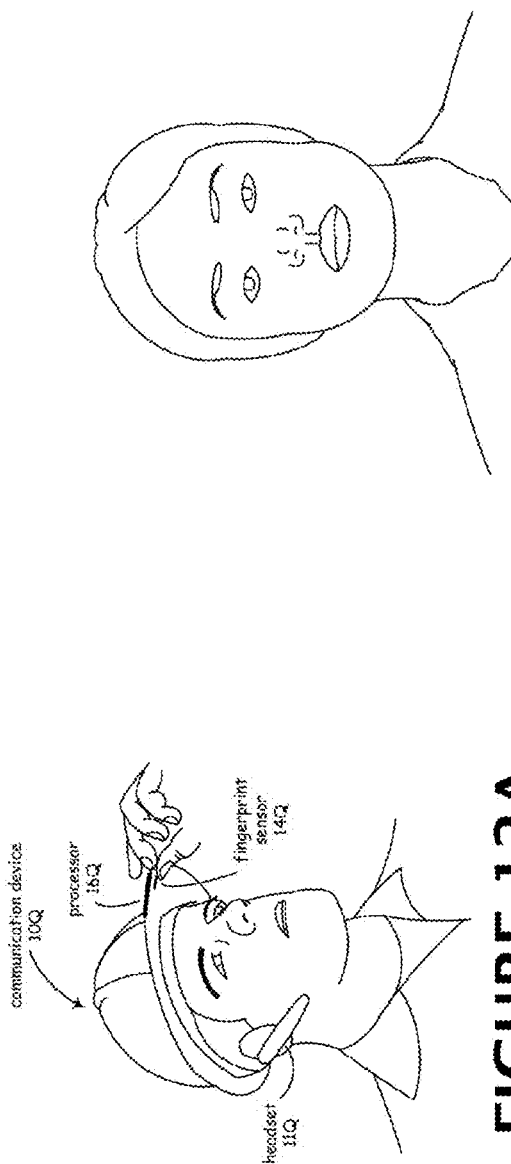
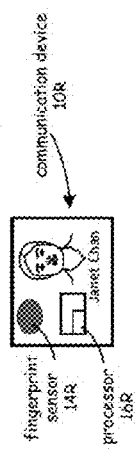
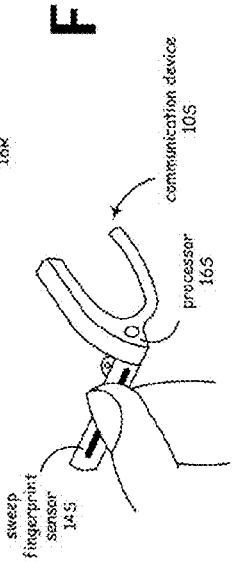
FIGURE 12A
SECURITY HEAD COVERING w/ SWEEP SENSOR
FIGURE 12B
SECURITY ID BADGE
FIGURE 12C
SECURITY EYE-COVERING w/ SWEEP SENSOR

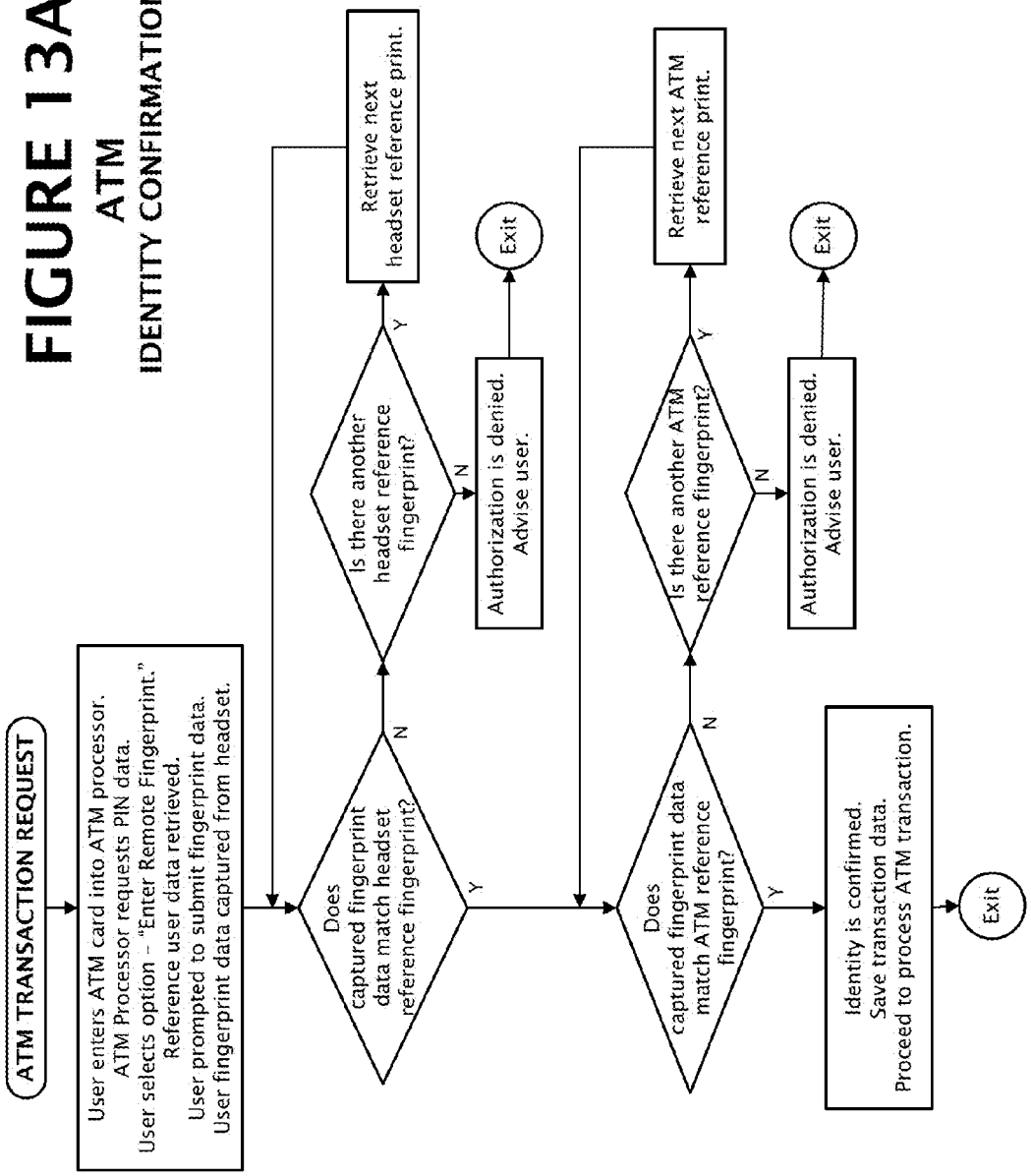

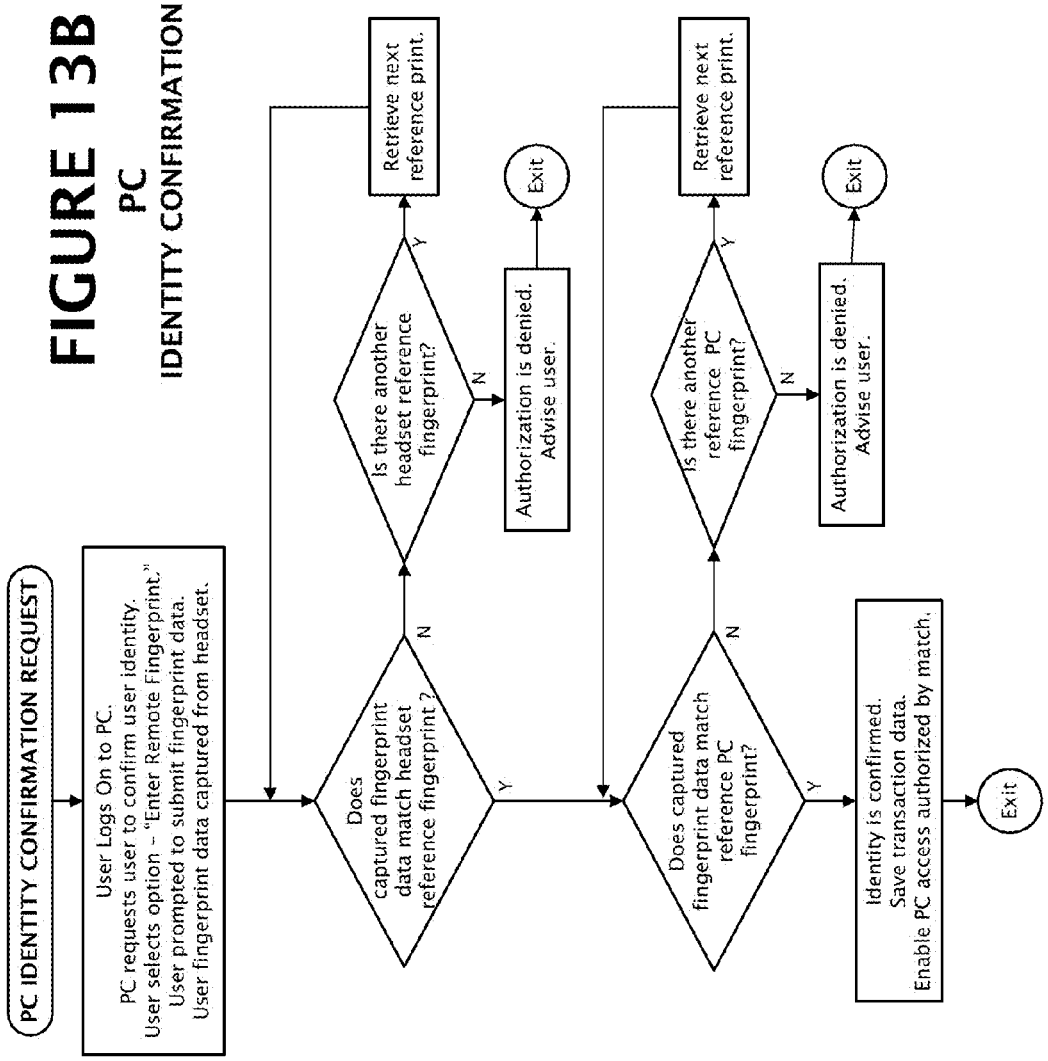

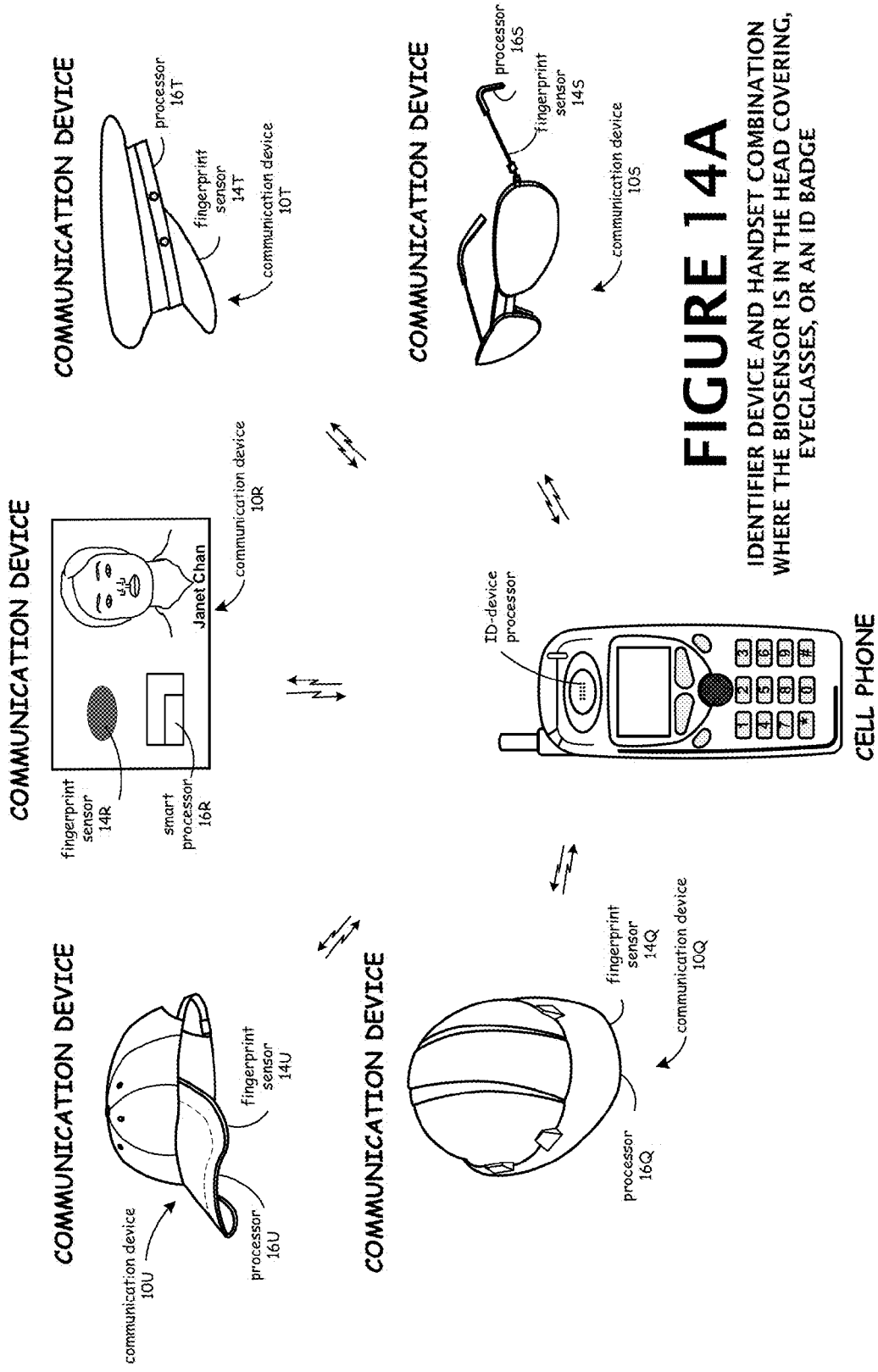

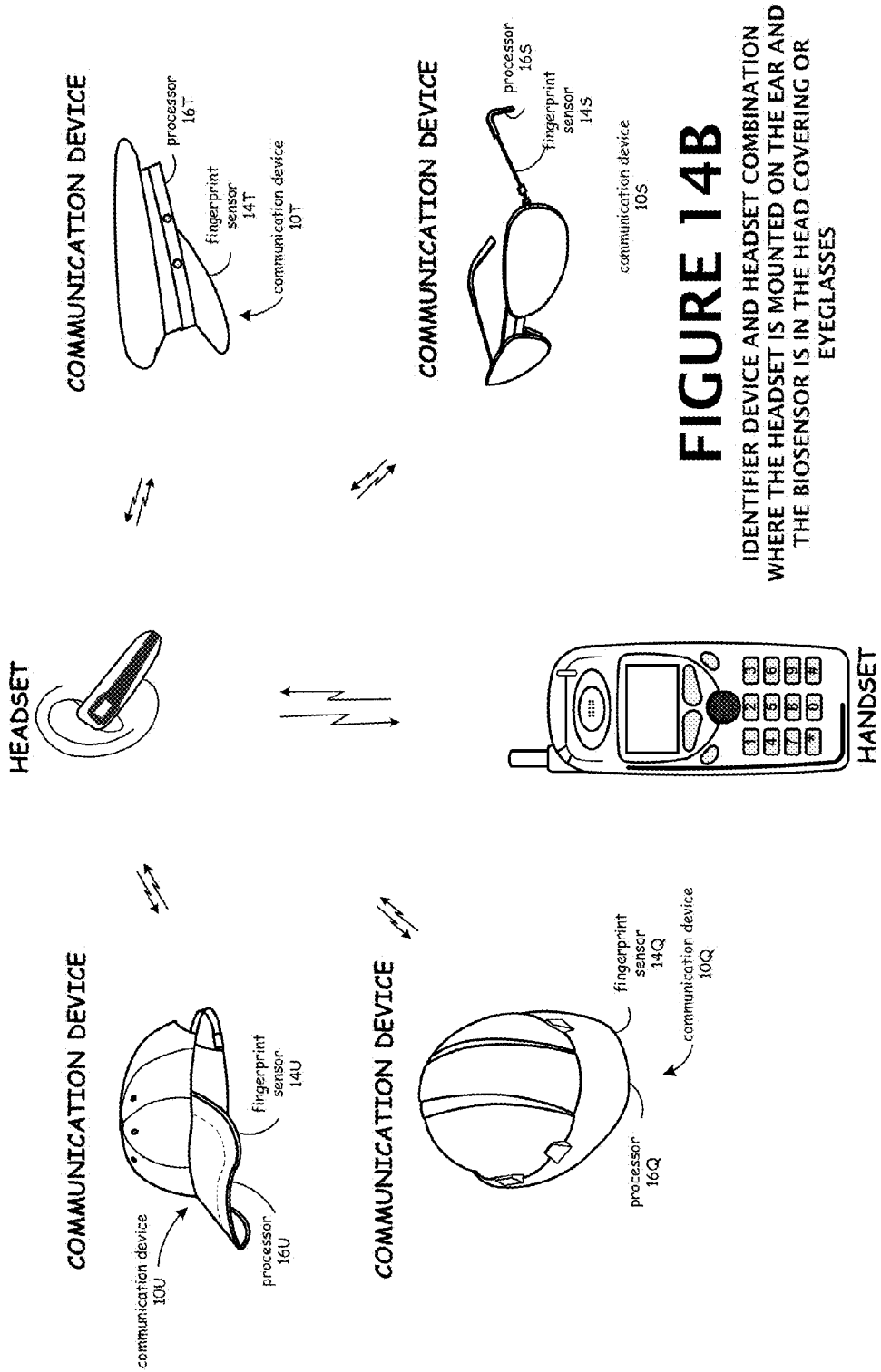

IDENTIFIER DEVICE
PROCESSOR SCHEMATIC

COMMUNICATION DEVICE
PROCESSOR SCHEMATIC

VOICE COMMAND

Personal Terminal-Based Security System

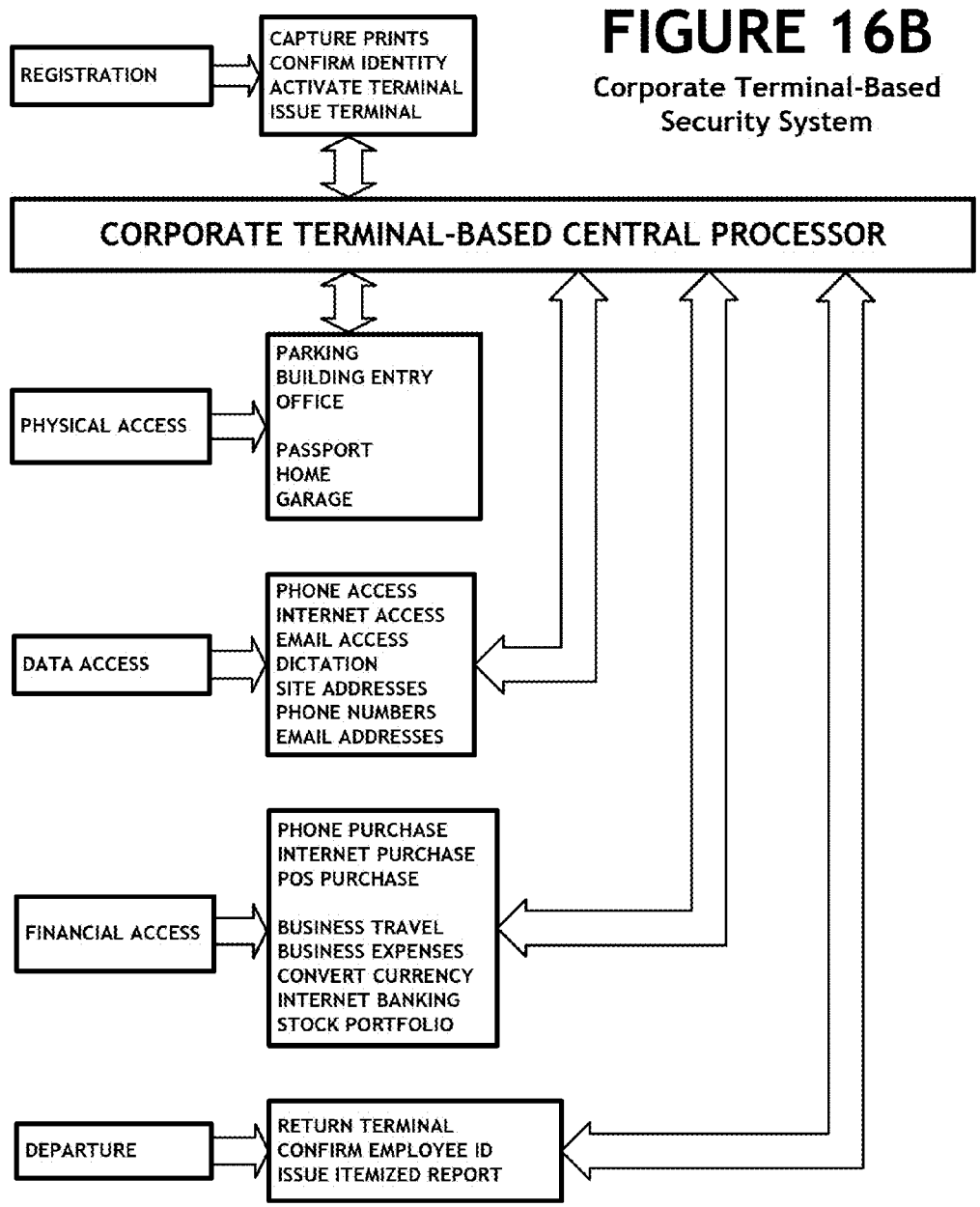

Resort or Luxury Cruise
Terminal-Based Security System

Hospital Terminal-Based Security System

Law Enforcement Terminal-Based
Processing System

MOBILE COMMUNICATION SYSTEM

This application is related to and claims priority to U.S. Provisional Application No. 60/783,785, entitled "Mobile Terminal," filed on Mar. 20, 2006; U.S. Provisional Application No. 60/788,084, entitled "Mobile Terminal With Glasses or Cap," filed on Mar. 28, 2006; U.S. Provisional Application No. 60/792,570, entitled "Mobile Terminal with Head Covering," filed on Apr. 16, 2006; U.S. Provisional Application No. 60/792,571, entitled "Mobile Terminal with Glasses or Head Covering," filed on Apr. 16, 2006; U.S. Provisional Application No. 60/801,634, entitled "Mobile Terminal With Glasses Or Cap," filed on May 18, 2006; U.S. Provisional Application No. 60/813,402, entitled "Mobile Terminal," filed on Jun. 14, 2006; U.S. Provisional Application No. 60/861,917, entitled "Mobile Terminal," filed on Nov. 30, 2006; U.S. Provisional Application No. 60/877,998, entitled "Mobile Terminal Device," filed on Dec. 29, 2006; PCT Application PCT/US2007/007288, entitled "Mobile Communication Device," filed on Mar. 20, 2007; and U.S. patent application Ser. No. 12/284405 entitled "Mobile Communication Device," filed on Sep. 22, 2008.

FIELD OF USE

The invention involves a mobile communication device that is dual purpose for use with a head set of a cell phone or pda, or as a stand-alone unit, and more particularly, as a hands-free mobile communication device is for use with to gain access to the most secure physical, financial, and data access.

BACKGROUND OF THE INVENTION

In recent years, we have witnessed exponential growth in the penetration rate of mobile telephones and personal digital assistants. The automobile was one of the first environments to become widely populated by cell phones beyond the home and office, allowing people to keep in touch while on the move, or while stuck in traffic. Due to the obvious dangers of holding a cell phone in one hand and driving with the other, many regions of the world either strongly recommend or legally enforce hands-free telephone operation in all moving vehicles. It is now illegal to use a handset while driving.

If a user is performing a task that requires both hands, then the user may not be able to interact with a device to receive a communication. For example, if a parent is grocery shopping with small children, the parent may not be able to handle a mobile telephone to answer an incoming call. Similarly, if a mobile telephone is carried in a purse or a backpack, the user may not be able to locate and answer the telephone before the caller hangs up, particularly if the user is also driving a vehicle. Furthermore, the use of a headset may allow a user to perform such applications without necessarily remaining stationary. Hands-free technology also allows users to multi-task in comfort, resulting in increased effectiveness and productivity.

We are becoming increasingly dependent upon computers to store and access data that affects our lives. Computers are able to remotely access time-sensitive information, on or near a real-time basis from the Internet. It is now essential that a user have access to computer data while at all times.

Currently, phone technology has is the wireless device of choice and many other technologies (e.g.—cameras, smartphones, Internet connections) are being made compatible with the cell phone.

Some cell phones provide hands-free units that permit the user to talk without having to hold the handset. However, even with the hands-free unit, the user must still dial the phone number or speak the phone number to initiate the call. In general, speech-recognition technology comprises a mechanism for receiving an input voice signal, comparing the input voice signal with stored voice signals, and determining if the input voice signal is sufficiently similar to any of the stored voice signals. If there is a match between the input and stored voice signals, instructions or other data is generated by the device.

In the state-of-the-art headsets the loudspeakers, microphones and communications transceiver devices are combined to a single headset device which is then attached to the users ear. In cordless and portable headset equipment only compact headset types that are mounted on one ear are able to meet the high requirements set by the user in regard to comfort and user friendliness.

A wearable computer provides the user with perfect recall of previously collected information. Rather than attempting to emulate human intelligence in the computer, wearable computing aims to produce a synergistic combination of human and machine, in which the human performs tasks that it is does better, while the computer performs tasks that it does better. Wearable computing affords mobility, personal empowerment, and the freedom from the need to be connected by wire to a communications line. U.S. Pat. No. 7,150,526 (Jannard) discloses wireless interactive headset in the shape of eyeglasses. And, U.S. Publication No. 20040204207 (Parker) discloses a hat, or baseball cap, modified to include a removable headset having a speaker and microphone and a rear mounted pocket holding a cell phone. And, U.S. Publication No. 20050116811 (Eros et al.) discloses a bracelet that the individual wears of a verification signal sent by a central computer unit.

Looking at some other biometric technology, U.S. Pat. No. 6,325,285 (Baratelli) discloses a smart card with integrated fingerprint reader. The sensing surface of the smart card is located such that a users thumb is naturally positioned over the sensing surface when the card is inserted into a suitable card reader. U.S. Pat. No. 7,088,220 (Kotzin) discloses a wireless communication device using a plurality of biometric sensors for assessing the identity of a user requesting access to a feature or service provided via the wireless communication device.

What is needed is a device that is ubiquitous to the user that readily carried and located when needed, that comes is a variety of fashions, and can be carried by the user that is compatible with a cell phone or a computer-based wireless communications device, which has become the platform for a broad range of wireless technologies.

What is needed is a device that can confirm the identity of the user in the most secure of all user applications involving either financial security, physical security, or data security, confirming irrefutably the identity of the user, providing bimodal or even multimodal biometric authentication, while enabling the convenience of the use of both hands at all times except when submitting such biometric data.

What is needed is a series of multi-purpose headsets for mobile terminals that are ubiquitous to the user to be able to confirm user identify from any of a variety of locations, and use such confirmation to gain physical access, financial access, and data access from any location in a smooth and seamless manner.

What is needed is wireless identifier device that is a headset, either as a stand-alone unit, with a cell phone, or with a computer-based wireless communications device, that can be worn for long periods of time with minimal discomfort to the user, that can provide fingerprint certainty for all identity authentication, the sensor being small, rugged, and inexpensive, the terminal enabling the person to have use of both hands for driving a car, encourages multi-tasking and enabling a user to access the most personal records from essentially any location.

SUMMARY OF THE INVENTION

The most fundamental issue in the mobile communication devices of the present invention is that of personal empowerment controlled by the wearer. The mobile communication devices of the present invention are hands-free systems that (1) do not require encumbering wires, (2) can be embedded into existing products worn on the head or about the face, (3) are phone-centric, use speech-recognition technology, and are easy to use, (4) can readily accept a user fingerprint sensor embedded into the device, (5) and can be used in a wide range of applications.

The dual-purpose mobile communication devices of the present invention are integrated into headsets; eye-coverings, such as prescription eyeglasses, sunglasses, or sports goggles; or head-coverings, such as a baseball cap, a civilian hard hat, a football helmet, a hoodie, or any other civilian head covering with a bill that is worn near the mouth of the wearer and can be used as a cell phone or computer-based wireless communications device, as a communication device with another terminal, or as a mobile computer terminal for audio communication with a central processor. The terminal device can operate as a stand-atone unit or with a cell phone, or computer-based wireless communications device. The mobile communication device of the present invention can also be used as a wireless identity authentication device with other electronic devices, such as cell phones, computers, or ATM's.

A fingerprint sensor is embedded or mounted onto the device. When user authentication is required, the user can be prompted to touch the fingerprint sensor. Initially, a person who needs to be authorized to use the terminal submits user data in a registration process. Reference biometric prints are captured during the registration prints, the biometric prints preferably being voice prints, and finger and thumb prints for both hands. Then, subsequently, when the person tries to either transmit or receive signals through the terminal, a sensor in the terminal captures a biometric of the voice, finger, or thumb, and compares such reading against the reference prints of authorized users. If and only if the prints match, user authentication is enabled. If the prints do not match, access is denied.

Multimodal authentication is preferred since the use of more than one authenticating factor decreases the likelihood of false positives, that is, the likelihood of an unauthorized user gaining access. The fingerprint is initially used, and the voiceprint is used for confirmation. Alternatively, multiple fingerprint images can be captured. Also, voice recognition is used to confirm the identity of the person wearing the headset.

In the preferred embodiment of the headset of the present invent, the headsets are "on" essentially all the time during the business day providing each user with full agility and mobility while in continuous audio communication. The headset enables each agent to have both hands free, which is needed for processing passengers.

The mobile communication device of the present invention is any device that includes memory and processing power, that has access to a central processing unit including memory and means for delivering data (computer screen, audio receiver) to the user, and means for the user to enter data (audio transmitter, keypad, camera, touch sensitive screen) to the central processing unit, such devices including but not limited to cell phones, cordless phones, conventional wired phones, tethered phones, cordless phones, walkie-talkies, handheld computers, personal digital assistants, pen-based computers, remote controls, smart phones, and similar-type device.

The mobile communication device of the present invention affords and requires mobility, and the freedom from the need to be connected by wire to an electrical outlet, or communications line. Rather than attempting to emulate human intelligence in the computer, as is a common goal of research in Artificial Intelligence, the goal of these mobile terminals is to produce a synergistic combination of human and machine, in which the human performs tasks that it is better at, while the computer performs tasks that it is better at.

Some of the advantages of the mobile communication device of the present invent is that it is both hands-free and eyes-free; is worn on the ear, face or head; can be easily found when needed; provides fingerprint certainty; can be used for (a) physical access; (b) data access; and (c) financial access; uses durable sensors that are compatible with other biometric systems; uses inexpensive sensors that are state-of-the-art; is compatible with cell phones, handheld computers, and personal computers; and provides a date-time stamp for all communications.

Short-distance wireless communication technologies are used to transmit data from a sensor to a headset, from a headset to a cellphone, from a headset to computer, or from an identification device to a computer. The wireless communicating based on these communication technologies can establish the cordless communication between devices and terminals, thereby simplifying the device connection work and, at the same time, enhancing convenience because it is substantially unnecessary to select installation spaces of the cordlessly connected devices.

To make a call using the mobile communication device of the present invention, the user needs to speak into the microphone the name or number that is sought. Speech-recognition technology is used, much the same as deployed in vehicles. For example, U.S. Publication No. 20050143134 (Harwood et al.) discloses a vehicular, hands-free telephone system. The appliance uses text-to-speech to transfer phonebook entries from the cell phone to memory of the appliance. The appliance uses text-to-speech to read and display text messages incoming to the cell phone for the operator to hear and view. The appliance initiates connecting and disconnecting of the cell phone with the appliance in response to voice commands of the operator.

The term "headset", as used herein refers to a mobile communication device for providing sounds into which sound signals output from a sound device are heard by a user, and the voice of the user is converted into electrical signals, the headset being either a stand-alone unit, in digital communication with another headset, a cell phone, or a computer. The headset enables the user to communicate hands-free. The term "cap" as used herein refers to a garment selected by a person to be worn as a fashion statement to cover the head of the person to provide warmth to the head, to protect the head from rain or snow, or to protect the eyes from the sun.

For a more complete understanding of the mobile terminal of the present invention, reference is made to the following detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention.

BRIEF DESCRIPTION OF THE DRAWINGS

FIGS. 1A and 1B disclose two preferred embodiments of the mobile communication device of the present invention.

FIGS. 1C, 1D, and 1E disclose three preferred embodiments of the mobile communication device of the present invention in the form of three different eye-coverings.

FIGS. 1F through 1K disclose additional preferred embodiment of the mobile communication device of the present invention in the form factor of various head coverings.

FIG. 2 is a schematic depicting the mobile communication device of FIG. 1K being used for financial access, data access, or physical access.

FIG. 3A discloses the mobile communication device of FIG. 1B having a short-distance wireless communication with a flip phone.

FIGS. 9A, 9B, and 9C disclose a shell for a cap-terminal of the present invention, the shell, being compatible with multiple conventional head coverings.

FIGS. 12A, 12B, and 12C disclose three alternative preferred embodiments of a simplified version of three additional embodiments of the communication device of the present invention, the communication device being deployed as an identification device in a head covering (FIG. 12A), an ID badge (FIG. 12B), or an eye-covering (FIG. 12C).

FIG. 13A discloses a simplified schematic for using the mobile communication device of either FIG. 1A or 1B to gain access to an account at an ATM. Similarly, FIG. 13B discloses a simplified schematic for using the mobile communication device of FIG. 1B to gain access to a PC or secure data within the PC.

FIG. 14A discloses the identifier device of the present invention as a head covering, an ID badge, or eyeglasses in direct wireless communication with the handset of a cell phone to identify the user or wearer of such identifier device; and FIG. 14B discloses the identifier device of the present invention as a head covering or eyeglasses in direct wireless communication with the headset, the headset then being in direct wireless communication with a handset of a cell phone for purposes of identifying the user or wearer of such device.

FIG. 16B discloses a simplified block diagram of a corporate terminal-based security system;

DETAILED DESCRIPTION OF THE INVENTION

Figure 1I:
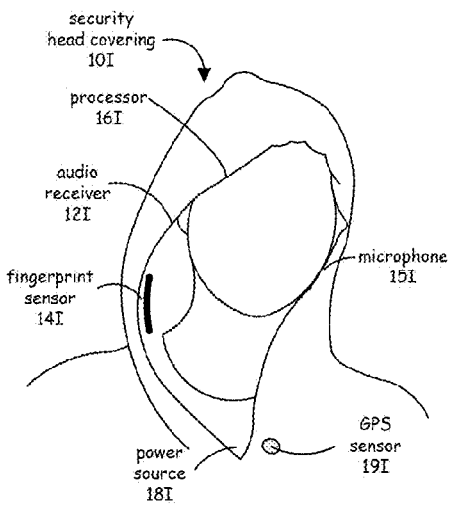

Referring now to the drawings, FIGS. 1A and 1B disclose two preferred embodiments of the mobile communication device (10A and 10B) of the present invention. The mobile communication device is a headset that is worn on the ear of a user. During routine usage, the units are hands-free, and only require a finger touch or sweep to authenticate the identity of the wearer.

The mobile communication device 10A of FIG. 1A is similar in appearance to a Plantronic Discovers 655 headset, and the mobile communication device 10B of FIG. 1B is similar in appearance to a Nokia HDW-3 wireless headset. Each communication device includes an audio receiver (12A and 12B), a microphone (15A and 15B), and a processor (16A and 16B).

The core of the mobile communication device of the present invention is a fingerprint sensor (14A and 14B respectively) enabling the person wearing the headset to authenticate user identity. The fingerprint sensor is commercially available from Authentec. If an area sensor is to be used (as shown), the MBF 200 is commercially available from Fujitsu of Japan, and the FPC1010 is commercially available from Fingerprint Cards AB of Gothenburg, Sweden. If a sweep sensor is used, the sensor of choice is either the Entrepad 1510 or the Entrepad 2510. The fingerprint is generally submitted upon response to a system prompt submitted to the wearer through the audio receiver. Another sweep sensor of choice is manufactured by Atmel, the AT77C104, the FingerChip having integrated navigation. The fingerprint sensor (14A or 14B) not only protects the phone and its stored information, but enables operators to provide new, profitable services such as mobile commerce and wireless banking. The sensor also allows manufacturers to easily add new features like gaming navigation, touch menu scrolling, multi-finger speed dialing, hot key application launch, favorite song and photo recall, and others that differentiate the phone and improve the user experience.

The mobile communication device 10A of FIG. 1A includes a power source 18A and is a self-contained unit. The power source 18A is a battery and provides power to the microphone 15A and the audio receiver 12A. The battery can be replaced or recharged. The mobile communication device of FIG. 1B is a headset for use with a cell phone, a computer, or a pda.

FIGS. 1C, 1D, and 1E disclose three preferred embodiments of the dual-purpose mobile communication device of the present invention (10C, 10D, and 10E) in the form of three different eye-coverings. The mobile communication device 10C of FIG. 1C is a pair of eyeglasses with corrective lenses. The mobile communication device 10D of FIG. 1D is a pair of sports goggles. The goggles can be used for bicycling, handgliding, mountain climbing, and the like. The mobile communication device 10E of FIG. 1E is a pair of sunglasses. Each eye-covering includes an audio receiver (12C, 12D, and 12E), a microphone (15C, 15D, and 15E), and a processor (16C, 16D, and 16D), and each mobile communication device includes a fingerprint sensor (14C, 14D, and 14E). The fingerprint sensor (14C, 14D, and 14E) enables the wearer of the eye-covering to authenticate user identity, the fingerprint generally being submitted upon response to a system prompt submitted to the wearer through the audio receiver (12C, 12D, and 12E). According to the invention, the microphone 15C, 15D, and 15E is preferably an ultra flat high-sensitivity one, preferably embedded on the underside of the tens and hidden, and facing the wearer. Electronic noise-reduction components to filter wind-generated noise from an audio signal transmitted from the microphone (not shown), are also located inside the frame, as well as suitable electrical connections. Electrical contacts for continuity must be provided at a corresponding hinge. As a result of the symmetry of the eye-coverings, the audio receivers (12C, 12D, and 12E) can be deployed for each ear, enabling the wearer to use the mobile communication device to play stereophonic sound for listening to music.

FIGS. 1F, 1G, and 1H disclose additional preferred embodiment of the dual-purpose mobile communication device of the present invention (10 F, 10G and 10H) in the form of head coverings, wherein each mobile communication device is used to confirm the identity of the wearer. The mobile communication device 1OF of FIG. 1F is in the form of a baseball cap, whereas FIGS. 1G and 1H disclose alternative head-covering designs. In each, a microphone (15F, 15G, and 15H) is positioned as an audio pickup in the bill of the head covering, which picks up words spoken by the wearer. Two sweep fingerprint sensors (14F, 14G, and 14H) are positioned on the underside of each bill, one sensor for each hand. As a result of the symmetry of the head covering, there are audio receivers for each ear, enabling the wearer to use the mobile communication device to hear music in each ear, which is optional.

FIG. 1I discloses another preferred embodiments of the dual-purpose mobile communication device of the present invention 10I, the mobile communication device being a security head covering. The mobile communication device is a head-covering hoodie 10I, such that adults can communicate with and locate teenagers, and also teenagers can communicate with each other via closed circuit or "walkie-talkie" or conventional cell phone lines on outdoor excursions. A cell phone or a computer-based wireless communications device can be carried in a pocket and wired to the audio receivers and microphone through the garments. Each garment includes an audio receiver 12I, a microphone 15I, and a processor 16I, and each mobile communication device includes a fingerprint sensor 14I. A global-positioning sensor 19I is used to locate the wearer, and the garment includes a power source 18I. The symmetry of the garment enables audio receivers for each ear, so that the wearer can use the mobile communication device 10I to listen to music.

Having a wearable computer on the face or as a head covering has much utility for people in outdoor applications—particularly, with the GPS sensor, and even without the biosensor. For example, a scout leader can maintain two-way communications continually with a group of scouts on an outdoor, overnight field trip. The scout leader equips each of the individual scouts with headsets with the GPS sensor. In the event that one or more scouts get lost, hurt, or otherwise separated from the main unit, the headset is an invaluable device for locating the separated scout or scouts.

Figure 1J:
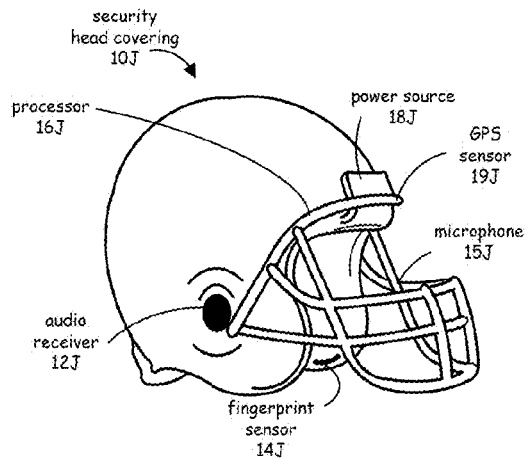

FIG. 1J discloses yet another preferred embodiment of the dual-purpose mobile communication device of the present invention 10J, the mobile communication device embedded in a football-helmet. Each helmet includes an audio receiver 12J, a microphone 15J, and a processor 16J, and each mobile communication device 10J includes a fingerprint sensor 14J. Each helmet includes a GPS sensor 19J and a power source 18J. The fingerprint sensor enables secure communications between the coaches and the quarterback, since a match is required before the audio signals are received by the quarterback. A sweep fingerprint sensor is shown.

Figure 1K:
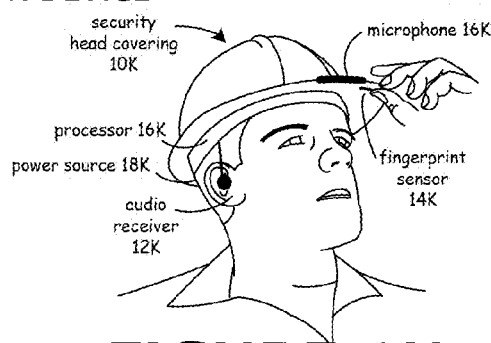

FIG. 1K discloses yet another preferred embodiment of the dual-purpose mobile communication device of the present invention 10K, the mobile communication device 10K being embedded in a civilian hardhat, the type typically used in building construction. Each helmet includes an audio receiver 12K, a microphone 15K, and a processor 16K, and each mobile communication device 10K includes a fingerprint sensor 14K, a sweep fingerprint sensor being preferred. Again, dual audio receivers are preferred.

FIG. 2 is a schematic depicting the mobile communication device of FIG. 1L being used for financial access, data access, or physical access by spoken communications with the designated gatekeepers. The dual-purpose communication device of the present invention enables biometric authentication of a user, said dual-purpose communication device being digitally connected to a communications system. The dual-purpose communication device can be a headset, a head covering, or an eye-covering. A processor is positioned with the communication device, and is in electrical communication with the fingerprint sensor in the communication device. A short-distance wireless communication device that is compatible with the processor positioned in the dual-purpose communication device of the present invention. The short-distance wireless communication device enables the retrieval of fingerprint data from a processor within the dual-purpose communication device. The biometric authentication is determined by another processor, said other processor being external to said dual-purpose communication device and is based at least in part upon a comparison of the sensed fingerprint data and reference fingerprint data of at least one authorized user. If the print in the communication device matches a reference print, eventually authentication will need to be confirmed with reference prints in the headset, cell phone, or master computer before authentication can be confirmed.

Figure 3B:
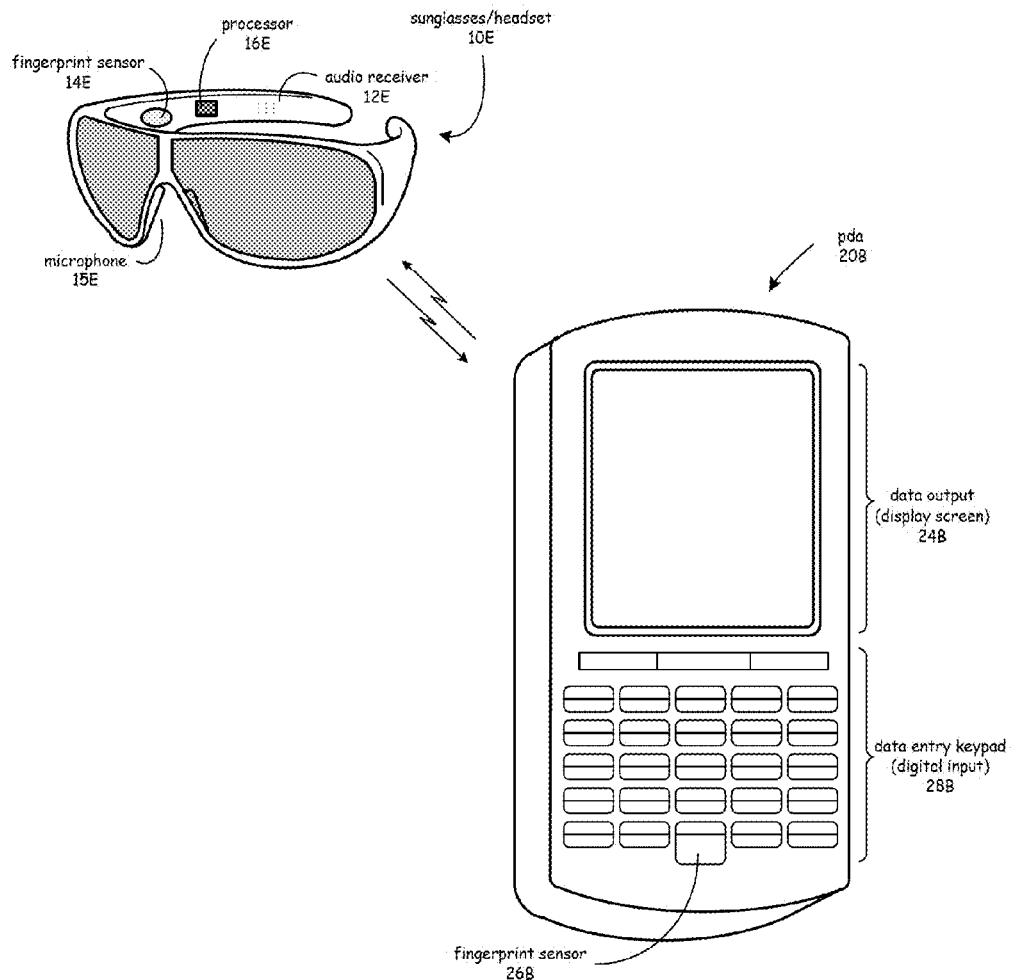
FIG. 3B discloses the mobile communication device of FIG. 1E having a short-distance wireless communication with a pda.

FIG. 3A discloses a yet still another preferred embodiment of the mobile communication device of the present invention, the mobile communication device 10B, the mobile communication device 10B being in a short-distance wireless communication with a flip phone 20A. The flip phone 20A includes a data entry keypad 28A and a display screen 24A. FIG. 3B discloses another preferred embodiment of the present invention deploying a mobile communication device 10E, the mobile communication device 10E being deployed as a headset for use with a pda 20B. The pda 20B includes a data entry keypad 28B and a display screen 24B. Short-distance wireless communication technologies can be used to transmit data from the mobile communication device to the cell phone. The wireless communicating based on these communication technologies can establish the cordless communication between devices and terminals, thereby simplifying the device connection work and, at the same time, enhancing convenience because it is substantially unnecessary to select installation spaces of the cordlessly connected devices. However, wired connections can also be deployed.

Figure 4A:
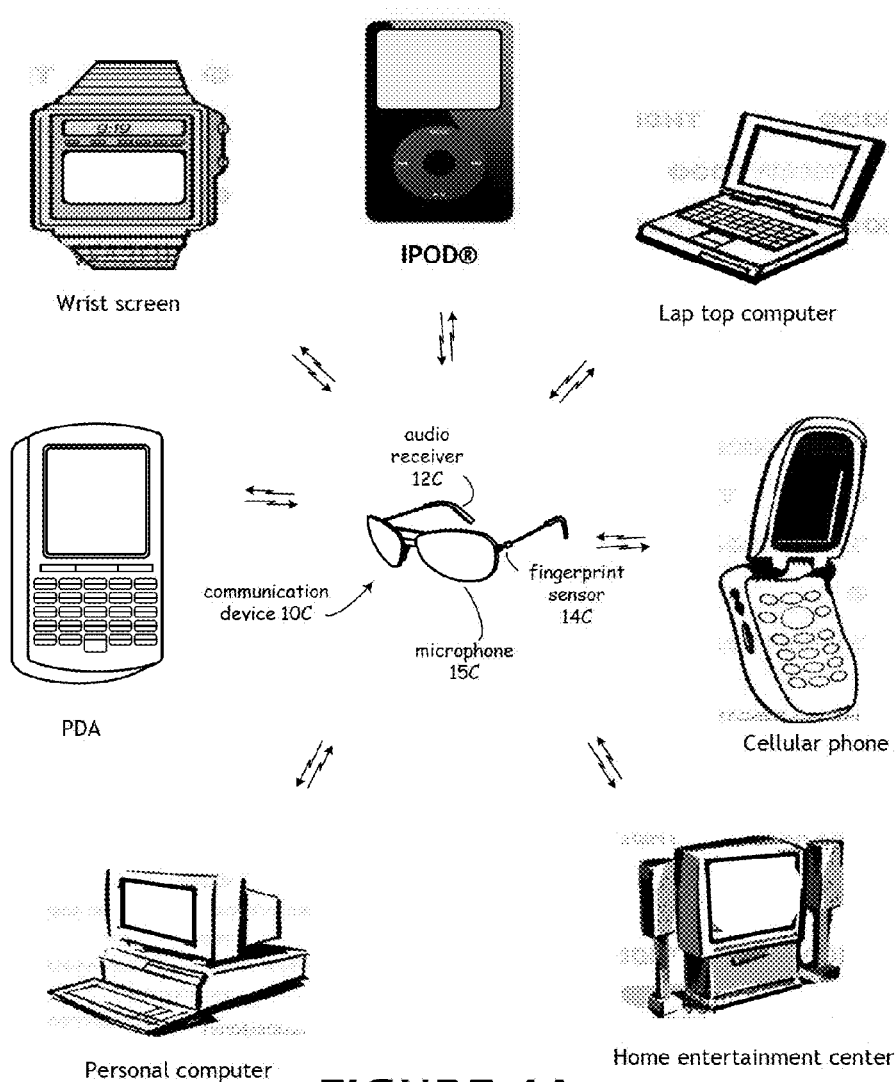
FIG. 4A discloses the mobile communication device of FIG. 1C being in short-distance wireless communication with various conventional devices (a wrist screen, an IPOD.RTM., a laptop computer, a handheld computer, a cell phone, a personal computer, and a home entertainment center).
Figure 4B:
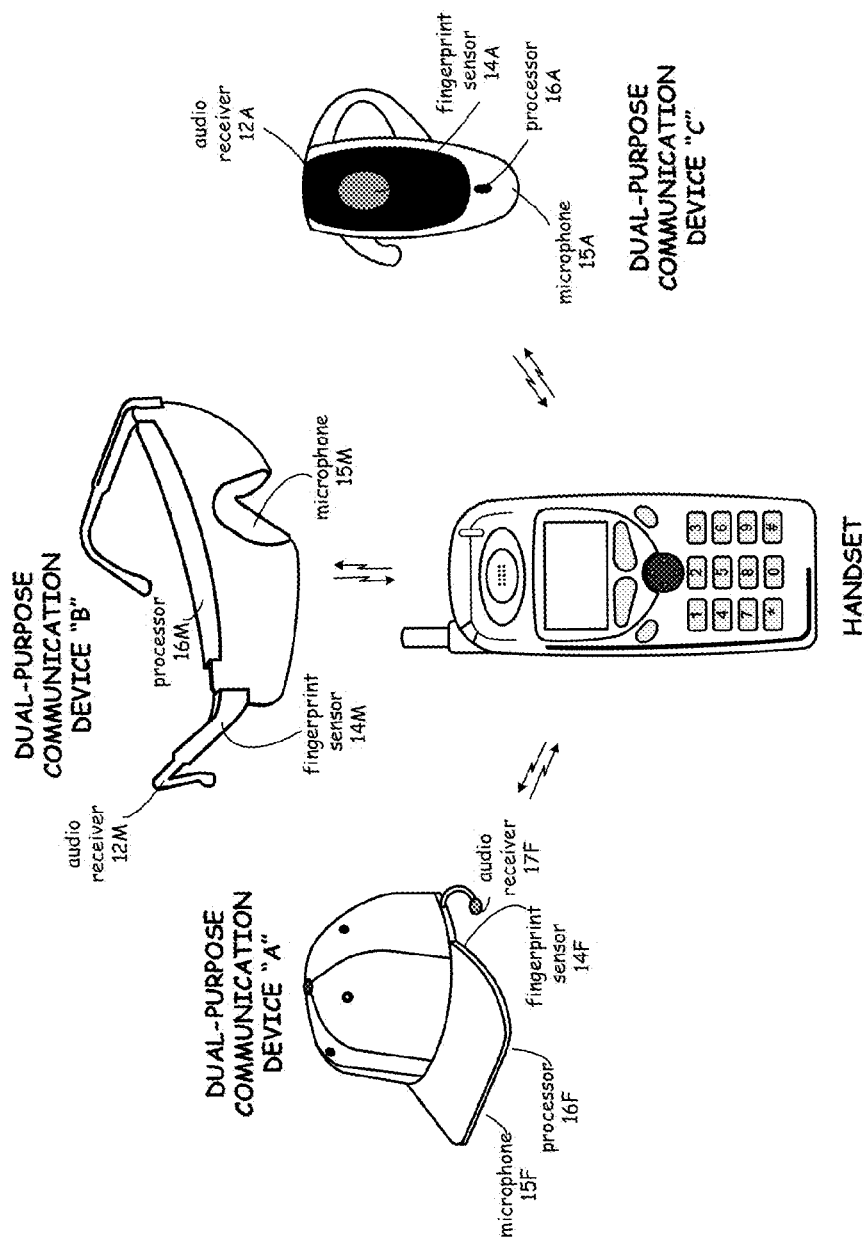
FIG. 4B discloses a preferred embodiment using a cell phone being in short-distance wireless communication with a plurality of different mobile communication devices of the present invention—a head covering, an eye covering, and a headset.

FIG. 4A discloses the mobile communication device of the present invention as pair of sunglasses, the mobile communication device having Bluetooth.RTM. compatibility with various conventional devices (a wrist screen, an IPOD.RTM., a laptop computer, a handheld computer, a cell phone, a personal computer, and a home entertainment center), the mobile communication device including a biosensor for identity authentication, an audio transmitter in the visor, either one or two audio receivers near the ears, preferably enabling plug-in connection with the ear canal(s), and a processor in the underside of the visor. By having the identity authentication in the headset, conventional electronic hardware can provide biometric security. With the exception of the home entertainment center, these connections can also be hardwired to the mobile communication device of the present invention. Hence, the mobile communication device of the present invention can also be used to access these devices, providing fingerprint security. FIG. 4B discloses a preferred embodiment using a cell phone that is compatible with a plurality of different mobile communication devices of the present invention, each mobile communication device being a headset and being used by the same or different users, and each mobile communication device providing biometric authentication through the headset.

Figure 5:
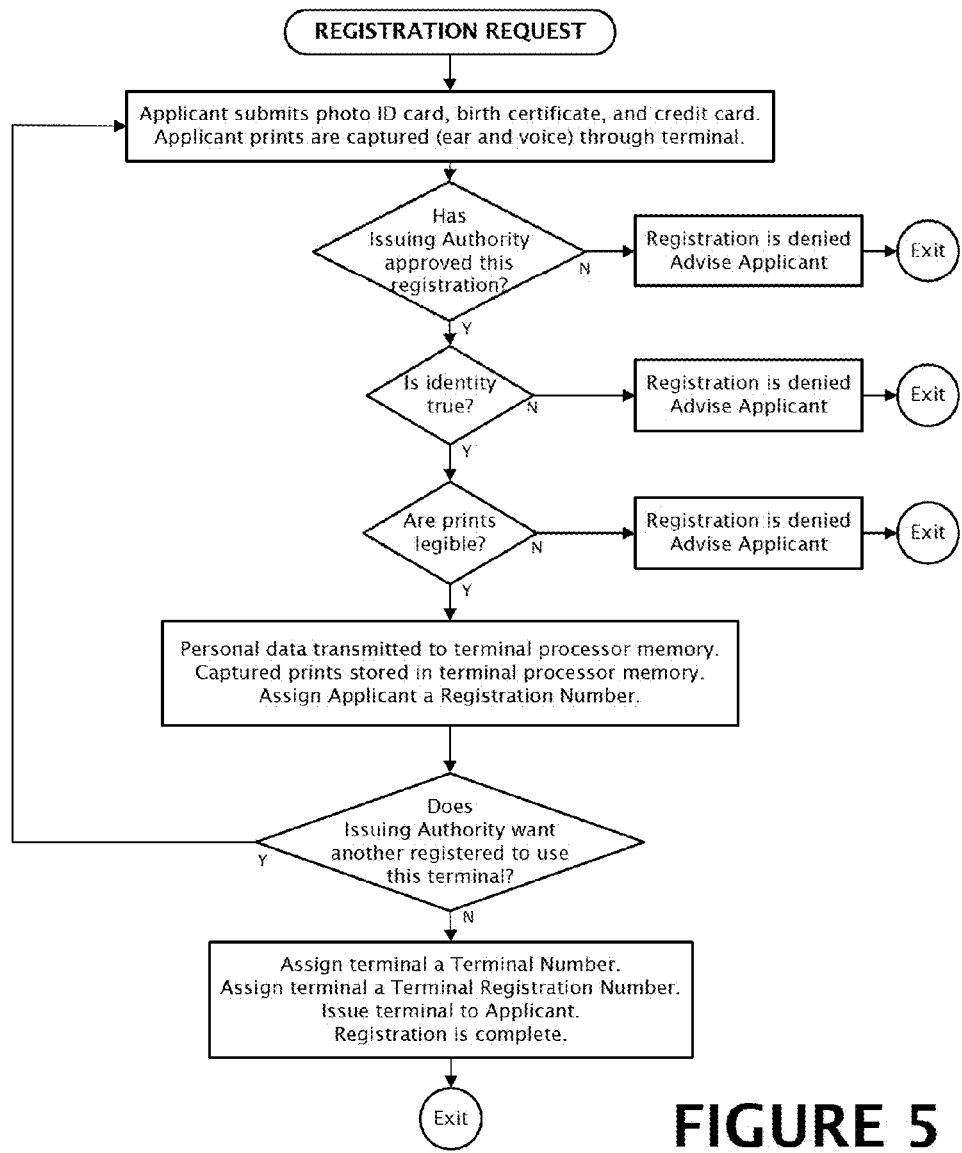
FIG. 5 discloses a preferred embodiment of a simplified logic diagram for a registration process for the mobile communication device of either FIG. 1A or 1B.

FIG. 5 discloses a preferred embodiment of a simplified logic diagram for a registration process for the mobile communication device of the present invention of either FIG. 1A or 1B, the pertinent data being submitted manually by the Applicant. Initially, a person authorized to use the terminal is registered through a registration process. Reference biometric prints are captured during the registration, the prints being voice prints, hand prints (index fingerprint, thumbprints, and palm prints for each hand), and ear prints. The ear print can be a shape of the ear lobe or pinna, a thermal image of the ear pinna, a vein pattern of the ear pinna, the shape of the ear canal, or some other biometric measurement associated with the ear. Then, subsequently, when the person tries to either transmit or receive signals through the terminal, a sensor in the terminal captures a biometric of the voice, hand, or ear, and compares such reading against the reference prints that are authorized to use the terminal. If and only if the prints match, use of the terminal is enabled. If the prints do not match, the terminal is disabled and no signals can be received or transmitted through said terminal. The issuing authority may be a corporation, a bank, a hospital, or a head-of-household. Preferably, the issuing authority will need to approve the user being added to the system.

Figure 6:
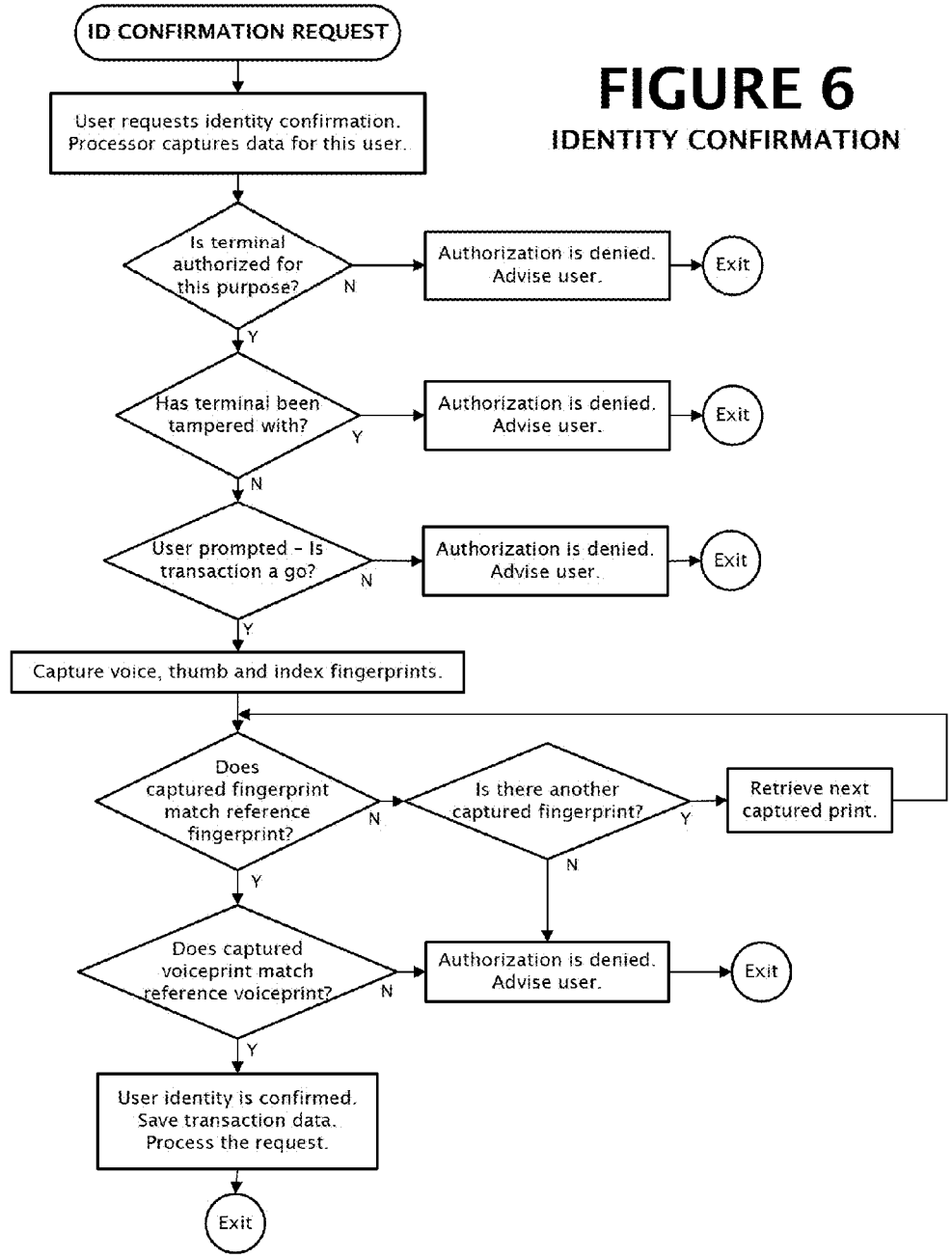
FIG. 6 discloses a preferred embodiment of a simplified logic diagram for an identity confirmation method using the mobile communication device of either FIG. 1A or 1B.

FIG. 6 discloses a preferred embodiment of a simplified logic diagrams for an identity confirmation method using the mobile communication device of either FIG. 1A or 1B.

Figure 7A:
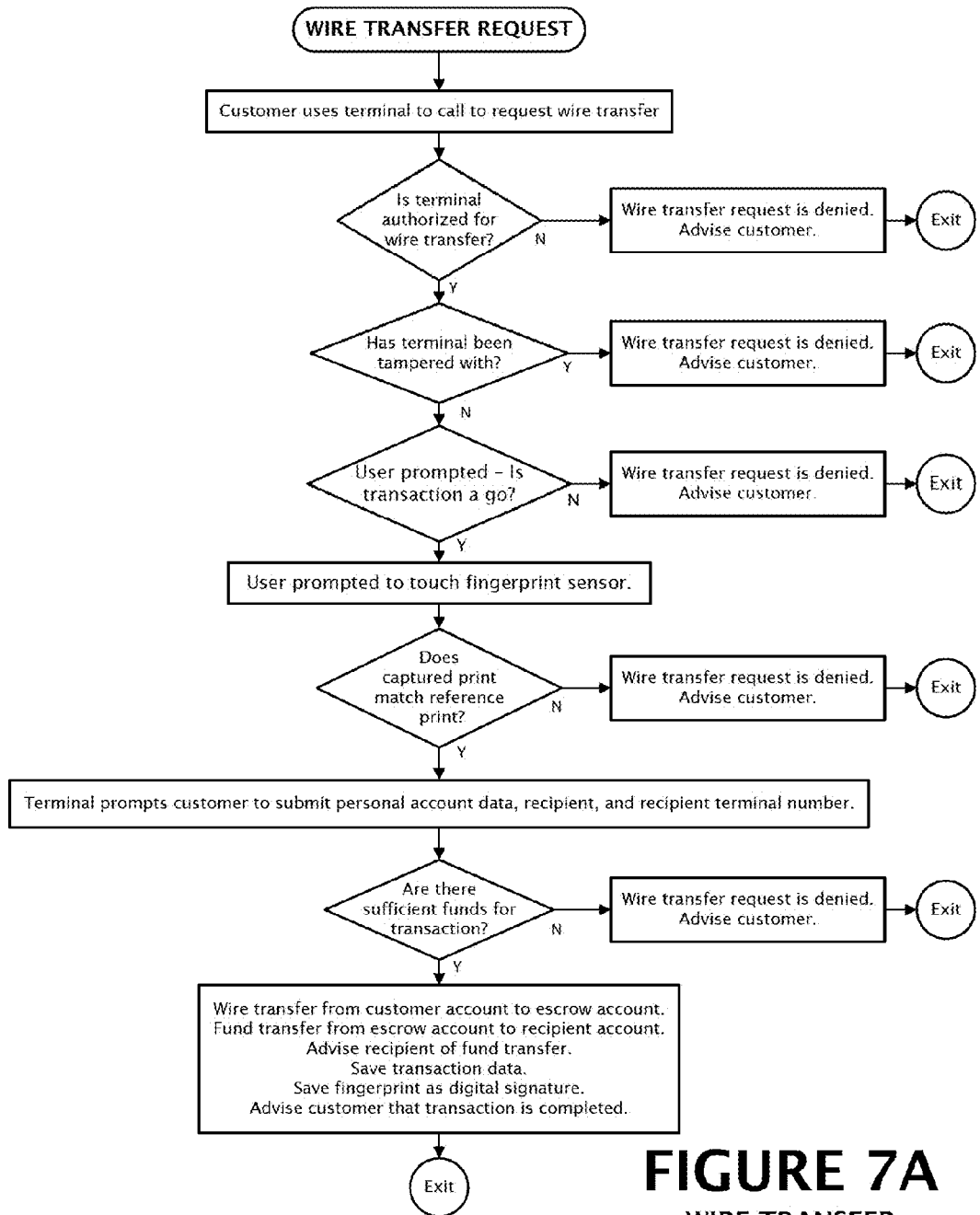
FIG. 7A discloses a preferred embodiment of a simplified logic diagram using the mobile communication device of either FIG. 1A or 1B for wire transferring funds.
Figure 7B:
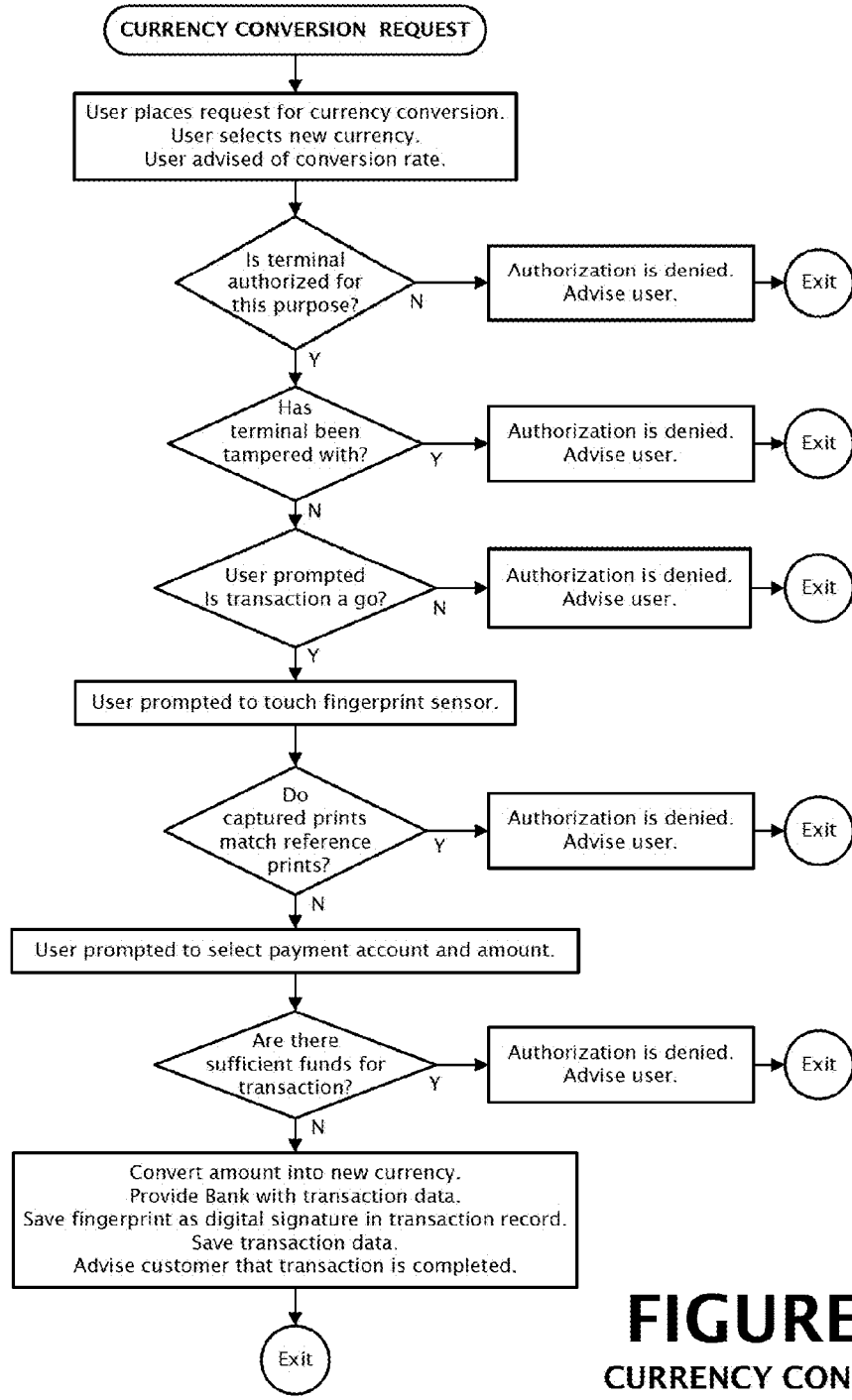
FIG. 7B discloses a preferred embodiment of a simplified logic diagram using the mobile communication device of either FIG. 1A or 1B for the buying stock on the Internet.

FIG. 7A discloses a preferred embodiment of a simplified logic diagram of a method for wire transferring funds using the mobile communication device of either FIG. 1A or 1B. The wire transfer is made to an escrow account, which is subsequently transferred to the account of the payee, the escrow account keeping the account number of the payee for purposes of privacy and account security. FIG. 7B discloses a preferred embodiment of a simplified logic diagram for using the mobile communication device of either FIG. 1A or 1B for currency conversion.

Figure 8:
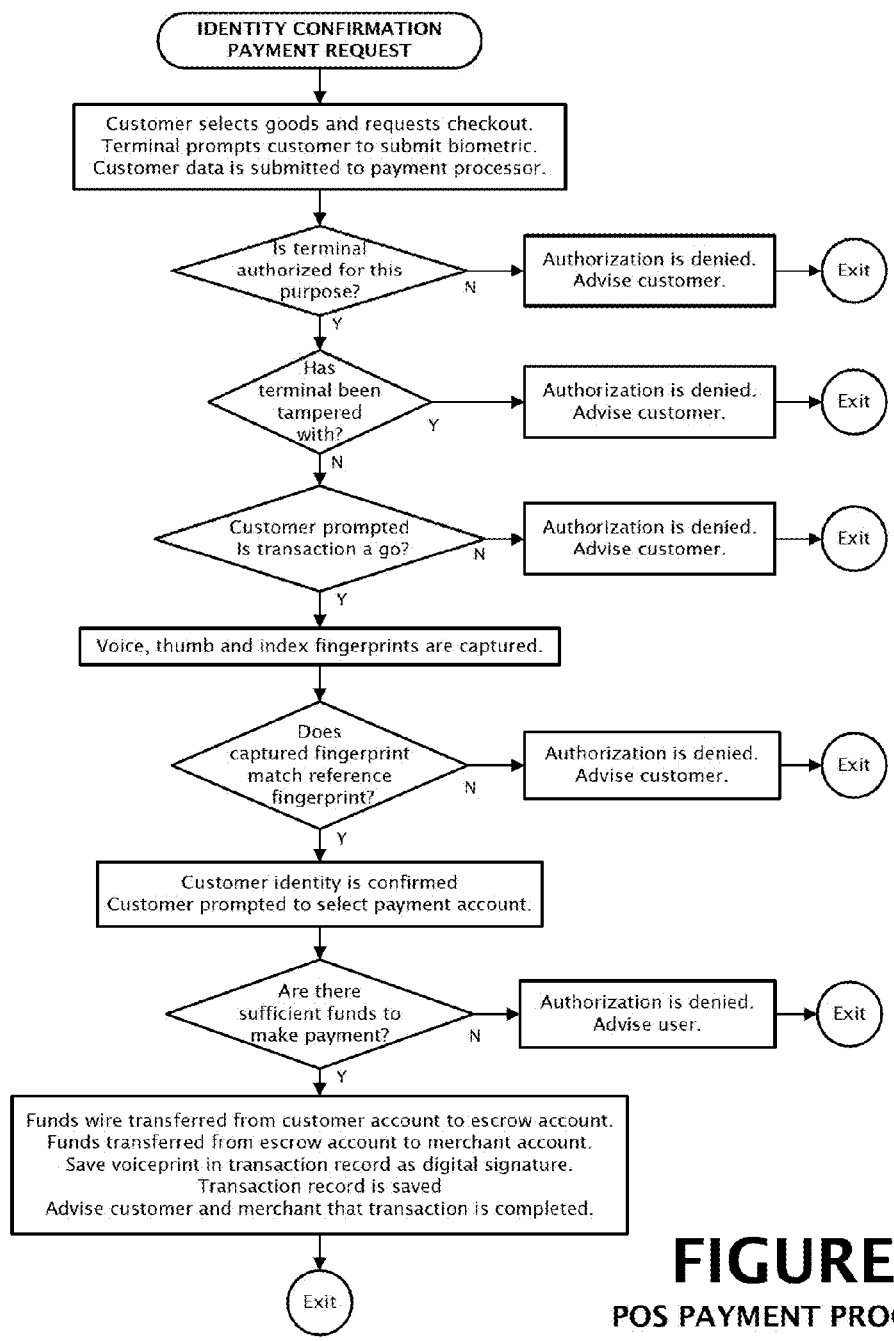
FIG. 8 discloses a preferred embodiment of a simplified logic diagram for using the mobile communication device of either FIG. 1A or 1B for payment processing at a checkout terminal.

FIG. 8 discloses a preferred embodiment of a simplified logic diagram for a payment processing system using the mobile communication device of either FIG. 1A or 1B for payment processing at a checkout terminal at a point-of-sale transaction.

FIGS. 9A, 9B, and 9C disclose a shell for a cap-terminal of the present invention, the shell, being compatible with multiple conventional head coverings, the shell including an audio transmitter and an audio receiver, a processor, and preferably a fingerprint sensor. The audio receiver is either for one ear or both ears, two ear reception being needed for listening to music. The audio receiver either covers the ears or is in close enough proximity to the ears that ear plugs are not needed.

Figure 10A:
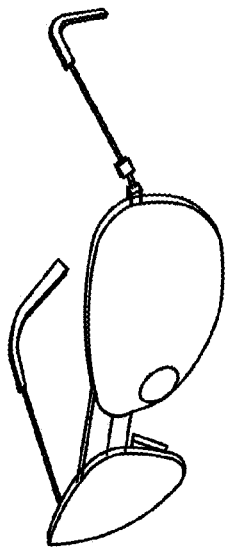
FIG. 10A discloses a conventional pair of glasses.
Figure 10B:
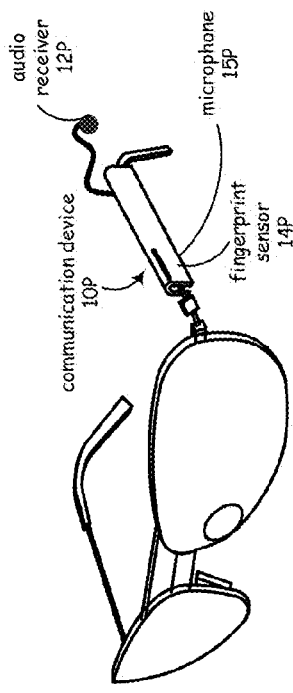
FIG. 10B and FIG. 10C disclose a preferred embodiment of the processor/headset unit of the present invention that is compatible with a wing or the frame, respectively, of the eyeglasses of FIG. 10A.
Figure 10C:
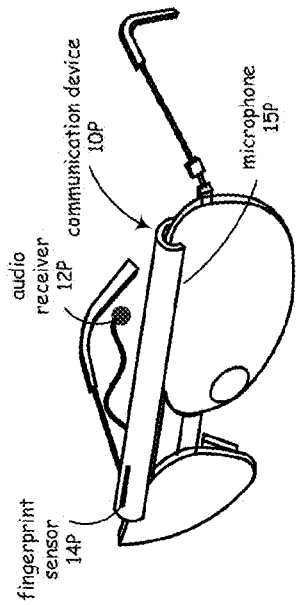

FIG. 10A discloses a conventional pair of glasses. FIG. 10B discloses a preferred embodiment of the processor/headset unit of the present invention that is compatible with an earpiece of the glasses of FIG. 10A, the headset unit including an audio transmitter and an audio receiver and a fingerprint sensor. FIG. 10C discloses another preferred embodiment of a processor/headset of the present invention that is worn above the lenses of the glasses, the headset unit being attachable above the lenses of the glasses, the headset unit including an audio transmitter and an audio receiver, and a fingerprint sensor.

Figure 11A:
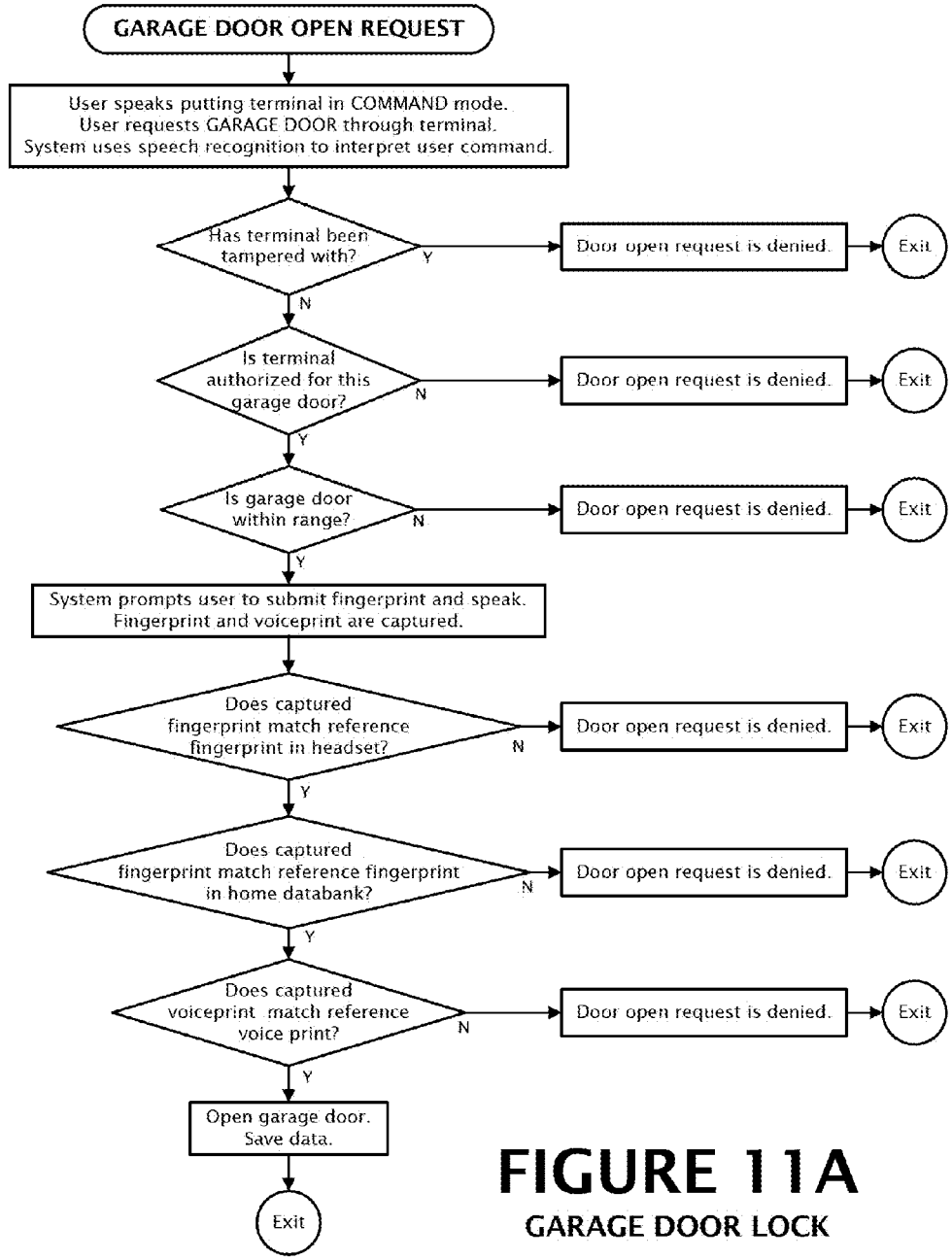
FIG. 11A discloses a preferred embodiment of a simplified logic diagram for using the mobile communication device of either FIG. 1A or 1B to access a garage door from inside a vehicle.

FIG. 11A discloses a preferred embodiment of a simplified logic diagram for using the mobile communication device of either FIG. 1A or 1B to access a garage door from inside a vehicle, the system being bimodal and using fingerprint and voiceprint matching, said prints being submitted during a registration process similar to one shown in FIG. 5, the user speaking "garage door" which are recognizable words to the system which prompts the system to request the user to submit a voiceprint using the terminal and a fingerprint using the terminal to confirm user identity before completing the processing of the request for opening the garage door.

Figure 11B:
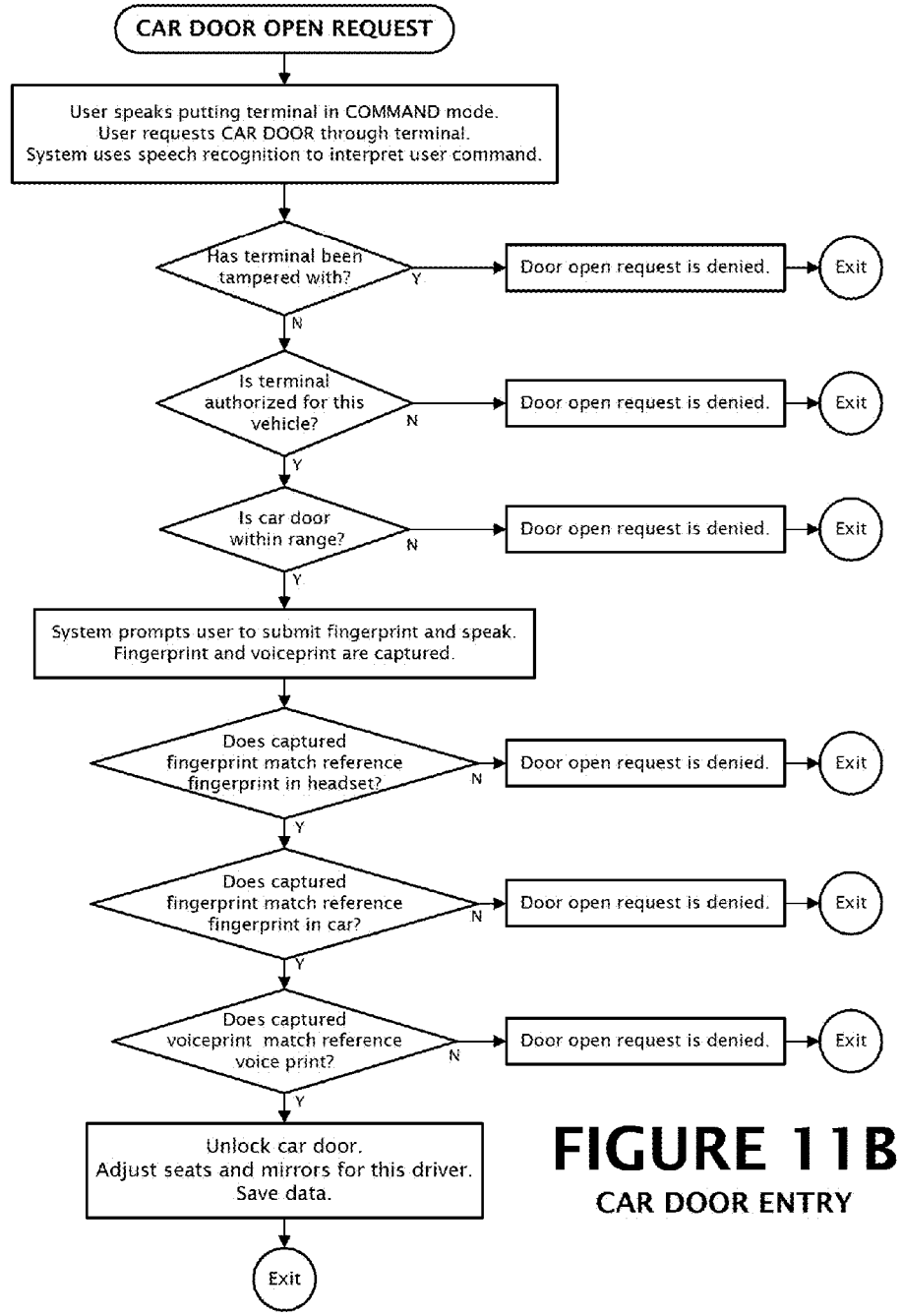
FIG. 11B discloses a preferred embodiment of a simplified logic diagram for using the mobile communication device of either FIG. 1A or 1B to access a car door from outside the vehicle.

FIG. 11B discloses a preferred embodiment of a simplified logic diagram for using the mobile communication device of either FIG. 1A or 1B to access a car door from outside the vehicle, the system being bimodal and using fingerprint and voiceprint matching, said prints being submitted during a registration process similar to one shown in FIG. 5, the user speaking "car door" which are recognizable words to the system which prompts the system to request the user to submit a voiceprint using the terminal and a fingerprint using the terminal to confirm user identity before completing the processing of the request for opening the car door.

FIGS. 12A, 12B, and 12C disclose three alternative preferred embodiments of a simplified version of dual-purpose mobile communication device being of the present invention (10Q, 10R, and 10S) for use an identification device. FIG. 12A discloses an eye-covering embodiment, FIG. 12B discloses an ID badge embodiment, and FIG. 12C discloses a head covering embodiment. Each embodiment includes a fingerprint sensor (14Q 14R, and 14S) and a processor (16Q, 16R, and 16S), the identification device (10Q, 10R, and 10S) being useful for authenticating the identity of the wearer for subsequent purposes of financial access, data access, or physical access. The processor (16Q, 16R, and 16S) is in electrical communication with the fingerprint sensor (14Q, 14R, and 14S) and compares captured fingerprint data with reference fingerprint data of at least one authorized user to determine if access is authorized.

FIG. 13A discloses a simplified schematic for using the mobile communication device of either FIG. 1A or 1B to gain access at an ATM. The on-site prepaid transaction uses the mobile headset terminal of either FIG. 1A or 1B which includes an RFID. The user at the ATM selects "Enter Remote Fingerprint" and an interrogator at the ATM receives the fingerprint data from the headset. Once the user fingerprint matches the reference fingerprint in the headset, the user fingerprint is compared against an ATM reference fingerprint. Similarly, FIG. 13B discloses a simplified schematic for using the mobile communication device of FIG. 1B to gain access to a PC or secure data within the PC. The user at the PC selects "Enter Remote Fingerprint" and an interrogator at the PC receives the fingerprint data from the headset. Initially, the user's fingerprint is compared against a headset reference fingerprint. If there is a match, then the user's fingerprint is compared against a system or network reference fingerprint template.

FIG. 14A discloses the identifier device of the present invention as a head covering, an ID badge, or eyeglasses in direct wireless communication with the handset of a cell phone for purposes of identifying the user or wearer of such device.

FIG. 14B discloses the identifier device of the present invention as a head covering or eyeglasses in direct wireless communication with the headset, the headset then being in direct wireless communication with a handset of a cell phone for purposes of identifying the user or wearer of such device.

Figure 15A:
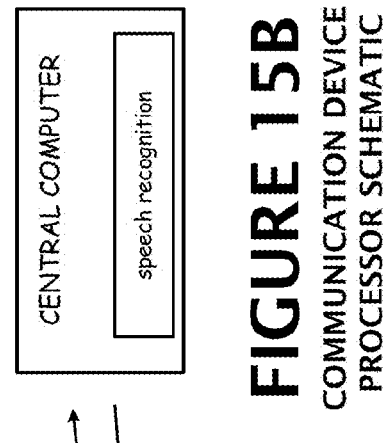
FIG. 15A discloses a simplified schematic of another preferred embodiment of the mobile communication device of the present invention used as an identifier device.
Figure 15B:
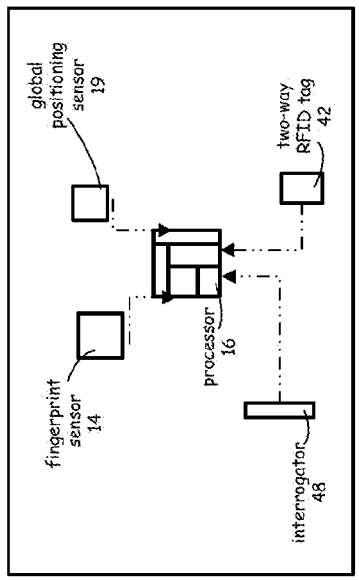
FIG. 15B discloses a simplified schematic of the preferred embodiment of the mobile communication device of the present invention in a wearable computer.

FIG. 15A discloses a simplified schematic of another preferred embodiment of the mobile communication device of the present invention in a head covering or glasses including a biometric sensor, a processor, a two-way RFID tag, a global-positioning sensor, and an interrogator. FIG. 15B discloses a simplified schematic of the preferred embodiment of the mobile communication device of the present invention in a wearable computer including an audio transmitter, an audio receiver, a biometric sensor, a processor, a two-way RFID tag, a global-positioning sensor, and an interrogator.

Figure 15C:
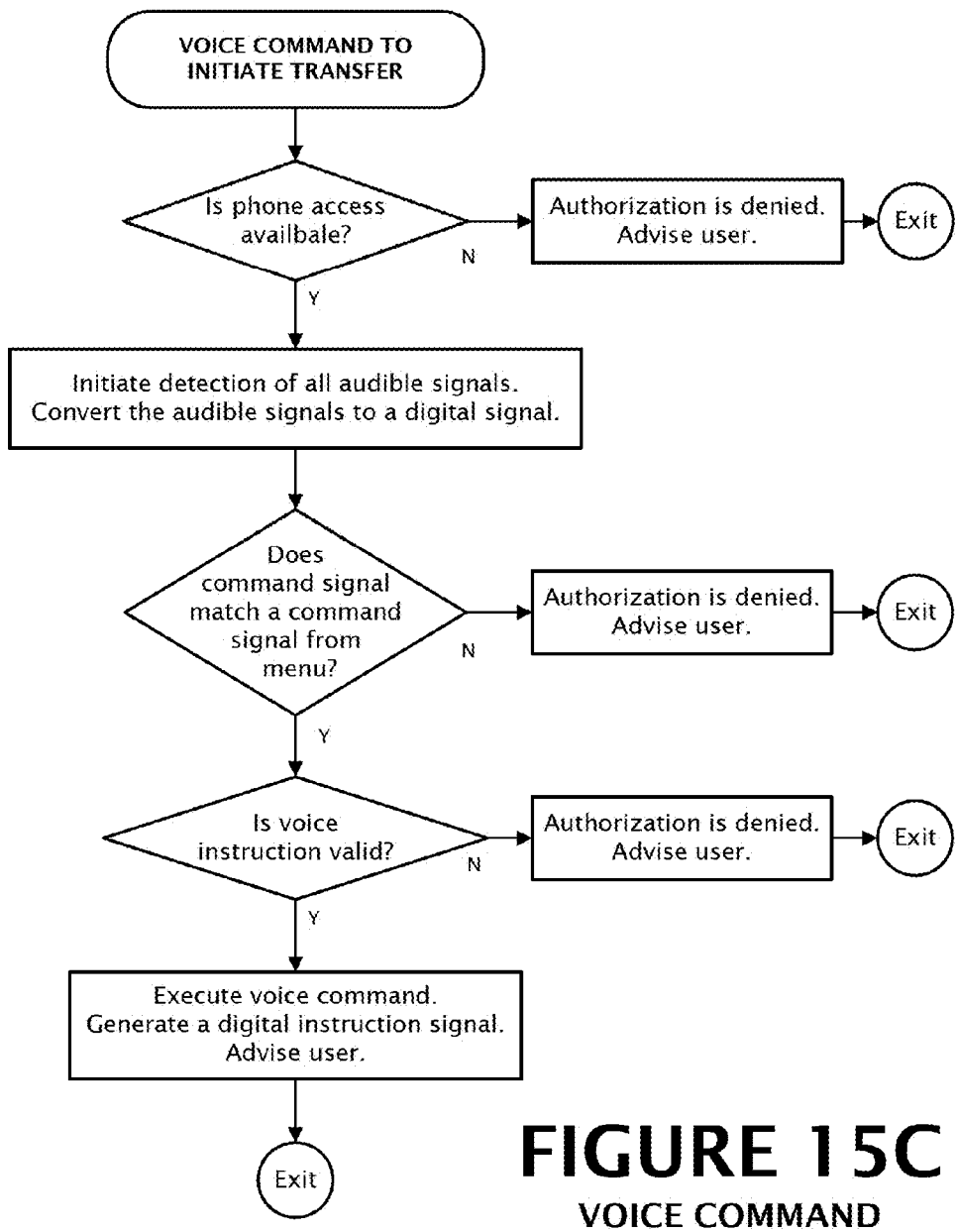
FIG. 15C depicts a simplified logic diagram for speech recognition using the mobile communication device of FIG. 1A or 1B, the user speaking commands to the microphone that are used for purposes of completing a phone call, for example.

FIG. 15B is a block diagram of depicting the terminal exemplary embodiments of terminal and headsets for using the invention. Specifically, the terminal for communicating with a central computer may comprise processing circuitry, which may include a processor for controlling the operation of the terminal and other associated processing circuitry. The processing circuitry will incorporate audio processing circuits such as audio filters and correlation circuitry associated with speech recognition. In accordance with one aspect of the present invention, the terminal is used in a voice-driven system, which uses speech recognition technology for communication. The headset provides hands-free voice communication between the wearer and the terminal. FIG. 15B illustrates a simple block diagram of one exemplary embodiment of the present invention. Specifically, FIG. 15B incorporates a headset, which is configured to communicate in one aspect on either a wired link or a wireless link with a portable terminal. Alternatively, portable terminal might be a stand-alone system or device that merely communicates with a user through the headset. In still another alternative embodiment, the headset might communicate directly on link to a central computer. FIG. 15C depicts a simplified logic diagram for speech recognition using the mobile communication device of FIG. 1A or 1B, the user speaking commands to the microphone that are used for purposes of completing a phone call, for example.

Multispectral Imaging, Inc. is a leader in the design and development of infrared imaging systems, today announced an exclusive worldwide license with Oak Ridge National Laboratory (ORNL) for its patents involving the use of microcantilever sensors for infrared imaging. The company is commercializing unique and proprietary technology that has the potential for radical improvements in both price and performance of uncooled infrared focal plane arrays.

Speaker authentication is also starting to move into call centers. As with speech recognition, call-center deployments have the potential for being a huge market. Call centers are under increasing pressure to automate as a way of reducing cost, attenuating the impact (and cost) of agent turnover, and providing services 24/7. Usually speaker authentication is partnered with speech recognition for customer-facing and partner-facing applications. Most often, speaker authentication is added to existing speech-recognition applications but it is an increasingly popular feature of new deployments as well.

Some call-center applications extend the definition of speaker authentication. For most applications, speaker authentication is synonymous with speaker verification: a one-to-one comparison of the voiceprint of the caller with the system's stored voiceprint for the identity the caller is claiming to have. In the call-center arena there are many applications where more than one person is authorized to access information or engage in secured activities (e.g., joint accounts). When those people share a password, which may occur when the password is an account number, the system needs to compare the caller's voiceprint with stored voiceprints for all of the authorized individuals. When the system only needs to determine whether the speaker belongs to the group of authorized speakers the process is called speaker classification. When the identity of the group member needs to be determined the process is called speaker identification. In either case it entails one-to-many matching.

A voice biometric is a numerical model of the sound, pattern and rhythm of an individual's voice. A voice biometric is as unique to an individual as a finger or palm print. The voice print is established in a registration session or over a period of time as the user continually uses the device.

Figure 16A:
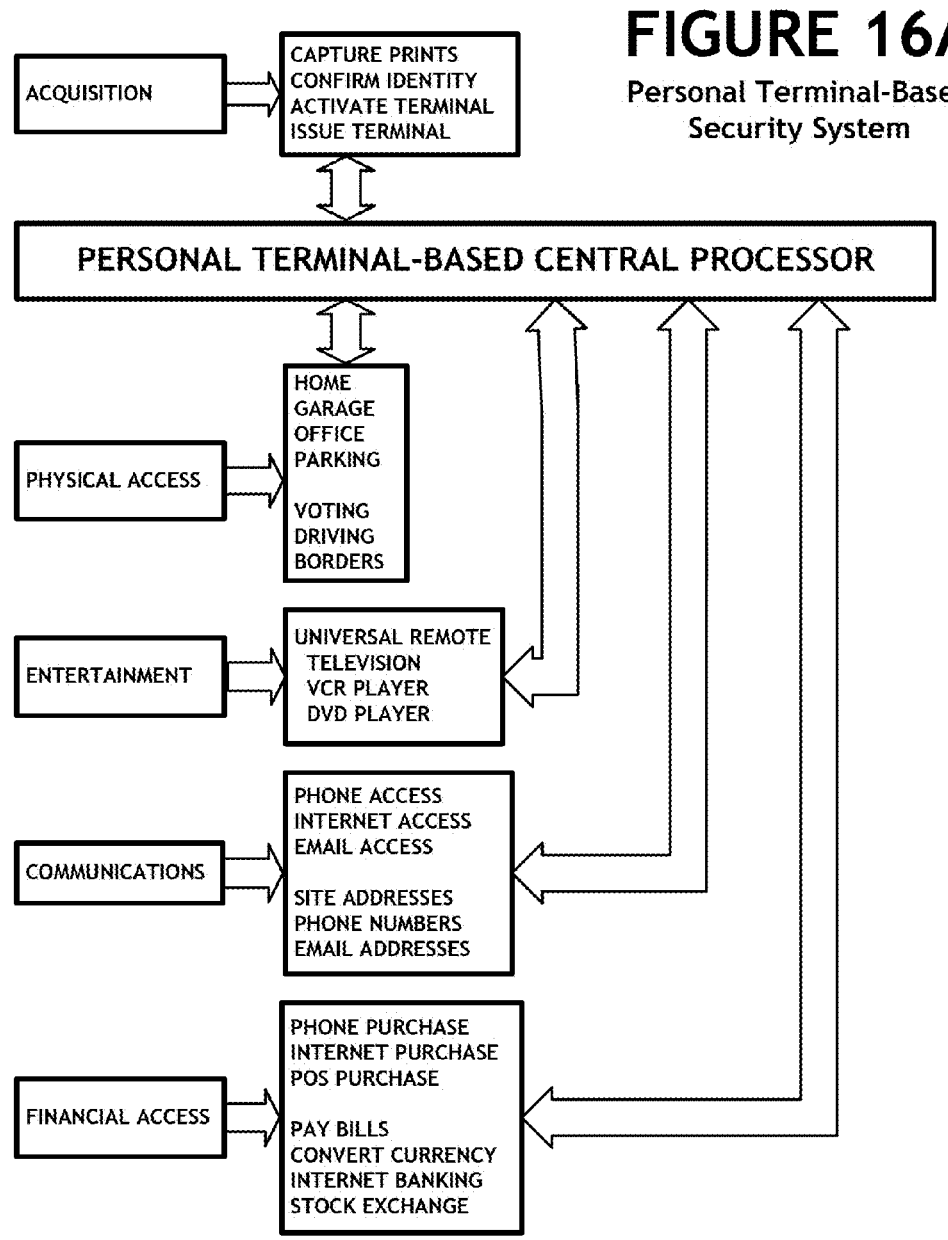
FIG. 16A discloses a simplified block diagram of a personal terminal-based security system.

FIG. 16A discloses a simplified block diagram for using either the mobile communication device headset of FIG. 1A or 1B with a personal terminal-based security system. The system can be used for physical access to home or office, as a garage door opener, a car door opener, as a universal handheld remote, for mobile communication device, Internet, and email access and purchases, in addition to making phone calls.

FIG. 16B discloses a simplified block diagram for using either the mobile communication device of FIG. 1A or 1B with a corporate terminal-based security system. The system can be used for physical access to home or office, Internet, and email access, for business expenses, currency conversion, managing a stock portfolio, and for making purchases, in addition to making phone calls.

Figure 16C:
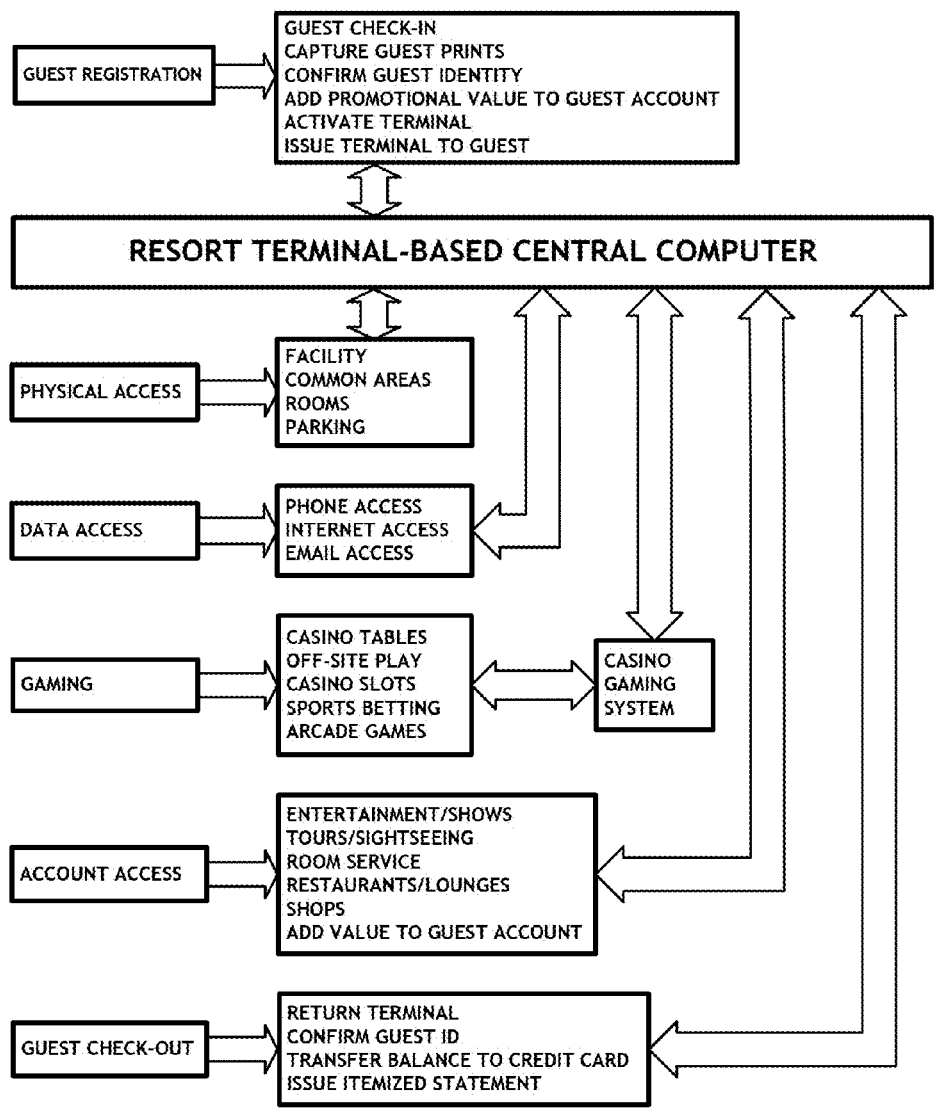
FIG. 16C discloses a simplified block diagram of a resort or luxury cruise terminal-based security system.

FIG. 16C discloses a simplified block diagram for using either the mobile communication device of FIG. 1A or 1B with a resort or luxury cruise terminal-based security system. The system can be used for assigning guests physical access to rooms and restricted areas, gaming activity, entertainment expenses, and for Internet, and email communications, in addition to making phone calls.

Figure 16D:
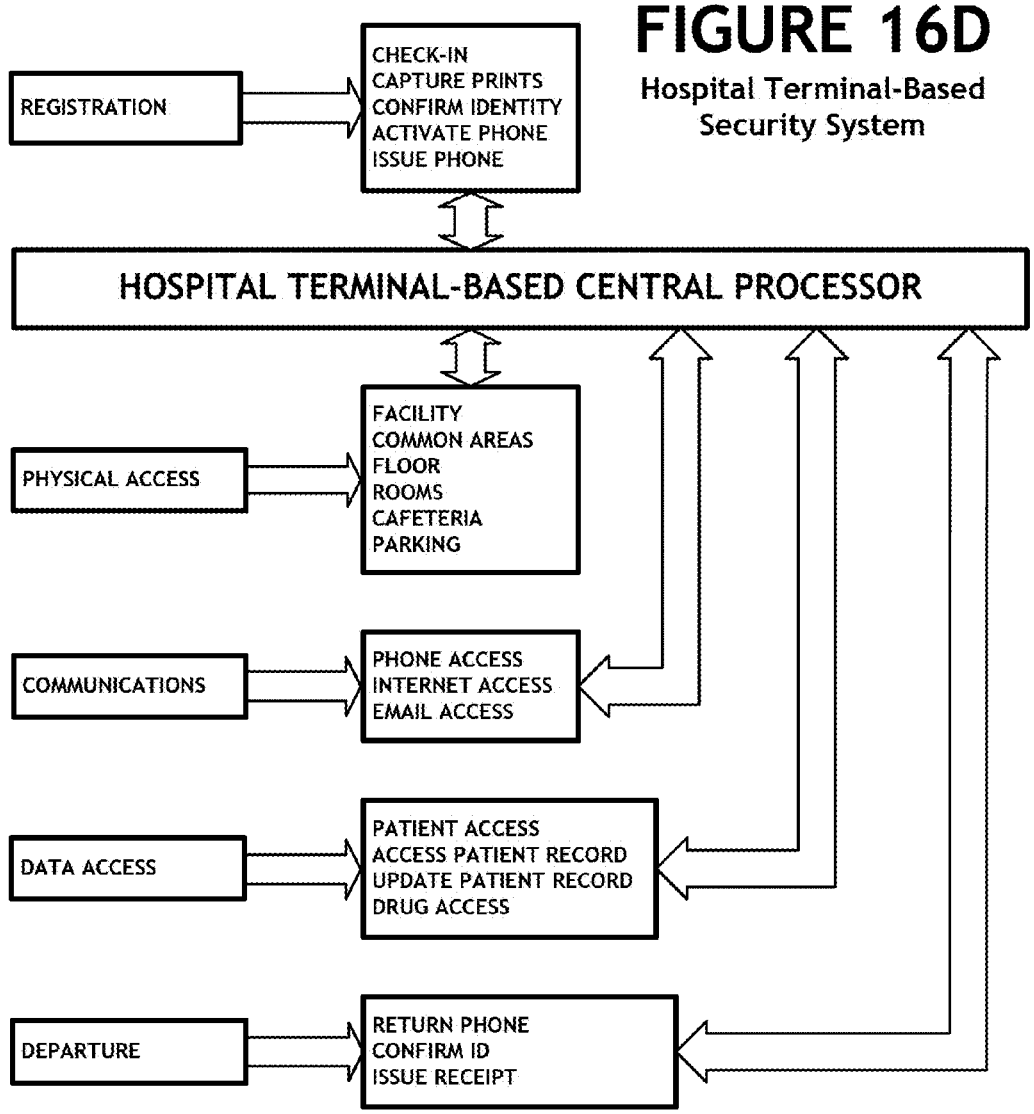
FIG. 16D discloses a simplified block diagram of a hospital terminal-based security system.

FIG. 16D discloses a simplified block diagram for using either the mobile communication device of FIG. 1A or 1B with a hospital terminal-based security system. The system can be used for physical access to the hospital and other grounds, for phone, Internet, and email access, and for accessing and updating of patient records.

Figure 16E:
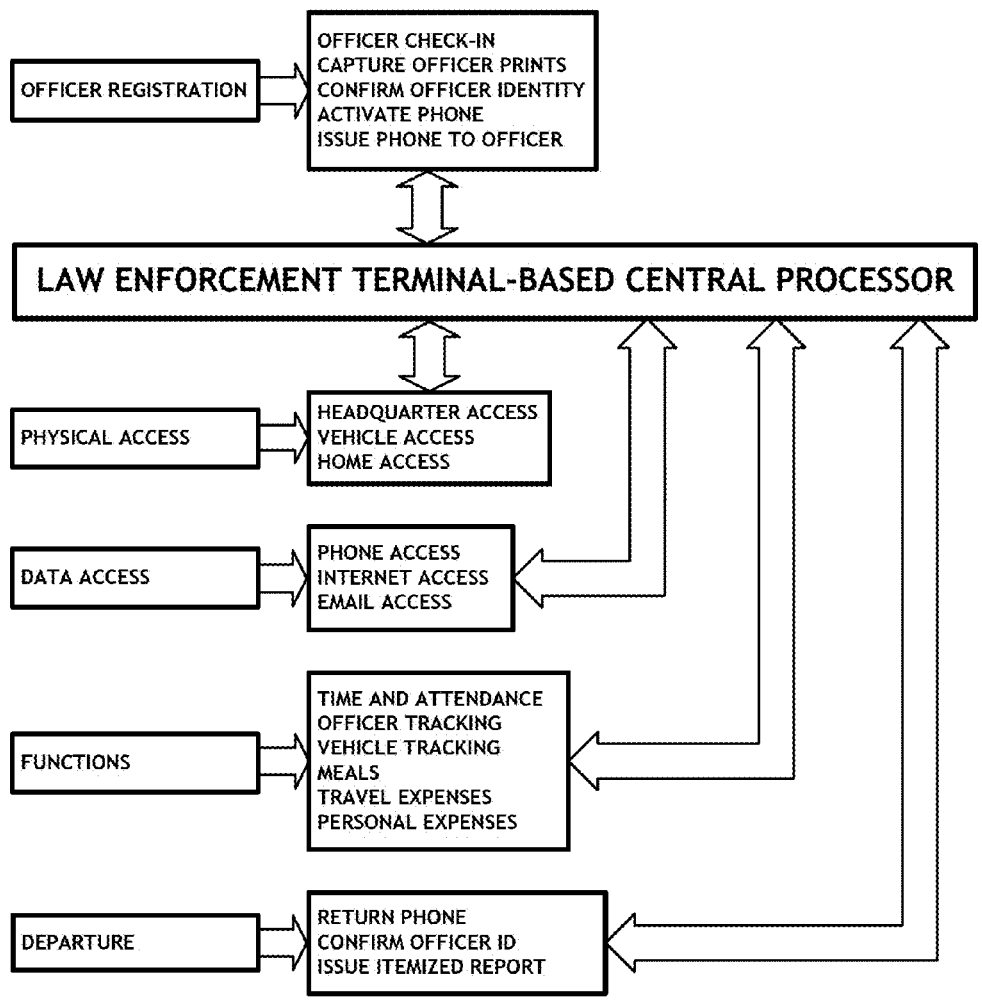
FIG. 16E discloses a simplified block diagram of a law-enforcement terminal-based security system, each deploying one of the mobile communication devices of FIG. 1A through 1K.

FIG. 16E discloses a simplified block diagram for using either the mobile communication device of FIG. 1A or 1B with a law enforcement terminal-based processing system. The system can be used for headquarters and vehicle access, time and attendance, officer and vehicle tracking, and for phone, Internet, and email communications.

The headset incorporates a microphone configured for capturing audio signals. The headset incorporates processing circuitry, which is configured for analyzing digitized representations of audio signals captured by the microphone. The processing circuitry will include suitable digitization circuitry for providing appropriate representations of the audio signals for further processing. In accordance with another aspect of the present invention, the processing circuitry includes speech detection circuitry, which is configured to analyze the sampled representations of the audio signals to detect speech of the user. The processing circuitry includes circuitry, or interfaces with circuitry, which is configured for transmission of the digitized or sampled representations to a device, such as portable terminal when speech is detected (see for example U.S. Publication No. 20050070337 (Byford et al.) which discloses a wireless headset for use in a speech recognition environment.)

Short-distance wireless communication technologies are used to transmit data from a sensor to a headset, from a headset to a cellphone, from a headset to computer, or from an identification device to a computer. The wireless communicating based on these communication technologies can establish the cordless communication between devices and terminals, thereby simplifying the device connection work and, at the same time, enhancing convenience because it is substantially unnecessary to select installation spaces of the cordlessly connected devices.

The short-distance wireless communication may be used, for example, not only for the data transfer between a computer main frame and its peripheral devices, but also for the data exchange between mobile information devices, and data and audio transmission between a telephone main body, a mobile music player, and a headset, and between a main phone and its cordless headset. BLuetooth™ is the short-distance wireless communication of choice. However, it is to be expressly understood that the metes and bounds of this invention are not to be so limited and that other short-distance wireless communication technologies which include DPOF (Digital Print Order Format) XML (extensible Markup Language), a wireless LAN standardized by IEEE802.11a/b/g/h or the like, UWB (Ultra Wide Band), HAVi™, ZigBee™, NFC, infrared communication, can also be used as short-distance wireless communication schemes.

Throughout there are various patents and patent applications and provisional applications referenced by patent number and inventor. The disclosures of these patents in their entireties are hereby incorporated by reference into this specification in order to more fully describe the state-of-the-art.

It is evident that many alternatives, modifications, and variations of the mobile computer terminal of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

The invention claimed is:

1. A method for accessing a central processor by means of a wearable computer for gaining physical access, financial access, and data access as approved by an issuing authority, said method comprising:
   a. receiving a user request at a processor remote from said wearable computer for physical access into a secure area or for access or entry of secure data or for financial access to purchase goods or services at a terminal;
   b. determining at a processing computer remote from said wearable computer if said wearable computer has been authorized for purpose of said user request by said issuing authority;
   c. prompting said wearable computer from a prompting processor remote from said wearable computer to submit fingerprint data to gain said physical access or said data access or said financial access;
   d. receiving user sensed fingerprint data submitted from said wearable computer, said receiving occurring in a processing computer remote from said wearable computer, said wearable computer enabling said user to have both hands free for said physical, financial and data access request except when submitting said fingerprint data, reference fingerprint data having been previously registered to authenticate user identity;
   e. comparing said sensed fingerprint data submitted through said wearable computer with said reference fingerprint in a comparing processor, said comparing processor being remote from said wearable computer;
   f. approving said user request to said physical access to said secure area and said data access if said user is authorized by said issuing authority, authentication of user identity being made at least in part based upon a comparison of said sensed fingerprint data with reference fingerprint data by an authorizing processor remote from said wearable computer; and
   g. approving said user request for said financial access if said user is authorized by said issuing authority and an account balance has not been exceeded, authentication of user identity being made at least in part based upon a comparison of said sensed fingerprint data with reference fingerprint data by an authorizing processor remote from said wearable computer.

2. The method of claim 1, wherein said wearable computer is an eye-covering, said fingerprint sensor is a sweep sensor, and said issuing authority is a corporation.

3. A method for accessing a central processor by means of a wearable computer for gaining physical access and data access as approved by an issuing authority, said method comprising:
   a. receiving a user request at a processor remote from said wearable computer for physical access into a secure area or for access or entry of secure data;
   b. prompting said wearable computer from a prompting processor remote from said wearable computer to submit fingerprint data to gain said physical access into said secure area or said data access;
   c. receiving user sensed fingerprint data submitted from said wearable computer, said receiving occurring in a processing computer remote from said wearable computer, said wearable computer enabling said user to have both hands free for said physical and data access request except when submitting said fingerprint data, reference fingerprint data having been previously registered to authenticate user identity; and d. comparing said sensed fingerprint data submitted through said wearable computer with said reference fingerprint, said comparing processor being remote from said wearable computer; and e. approving said user request to said physical access and said data access if said user is authorized by said issuing authority, authentication of user identity being made at least in part based upon a comparison of said sensed fingerprint data with reference fingerprint data by a processor remote from said wearable computer.

4. The method of claim 3, wherein said wearable computer is a head covering, said fingerprint sensor is a sweep sensor, and said issuing authority is a law enforcement agency.

5. The method of claim 3, further comprising determining if user terminal has been authorized for purpose of said user request by said issuing authority prior to prompting said user, said determining being performed in a processing computer remote from said wearable computer.

6. The method of claim 3, wherein said wearable computer is an eye-covering, said fingerprint sensor is a sweep sensor, and said issuing authority is a head-of-household.

7. The method of claim 3, wherein said wearable computer is a headset, said fingerprint sensor is an area contact sensor, and said issuing authority is a head-of-household.

8. The method of claim 3, wherein said wearable computer is an eye-covering, said fingerprint sensor is a sweep sensor, and said issuing authority is a hospital.

9. The method of claim 3, wherein said wearable computer is a headset, said fingerprint sensor is an area contact sensor, and said issuing authority is a hospital.

10. A method for accessing a central processor by means of a wearable computer for gaining financial access and data access as approved by an issuing authority, said method comprising:

a. receiving a user request at a processor remote from said wearable computer for access or entry of secure data or for financial access to purchase goods or services at a terminal;

b. prompting said wearable computer from a prompting processor remote from said wearable computer to submit fingerprint data to gain said financial access or said data access;

c. receiving user sensed fingerprint data submitted from said wearable computer, said receiving occurring in a processing computer remote from said wearable computer, said wearable computer enabling said user to have both hands free for said financial and data access request except when submitting said fingerprint data, reference fingerprint data having been previously registered to authenticate user identity;

d. comparing said sensed fingerprint data submitted through said wearable computer with said reference fingerprint, said comparing processor being remote from said wearable computer;

e. approving said user request to said data access if said user is authorized by said issuing authority, authentication of user identity being made at least in part based upon a comparison of said sensed fingerprint data with reference fingerprint data by an authorizing processor remote from said wearable computer; and f. approving said user request for said financial access if said user is authorized by said issuing authority and an account balance has not been exceeded, authentication of user identity being made at least in part based upon a comparison of said sensed fingerprint data with reference fingerprint data by an authorizing processor remote from said wearable computer.

11. The method of claim 10, wherein said wearable computer is an eye-covering, said fingerprint sensor is a sweep sensor, and said issuing authority is a bank.

12. The method of claim 10, wherein said wearable computer is a headset, said fingerprint sensor is a sweep sensor, and said issuing authority is a law enforcement agency.

13. The method of claim 10, further comprising determining if said wearable computer has been authorized for purpose of said user request by said issuing authority prior to prompting said user, said determining being performed in a processing computer remote from said wearable computer.

14. A method for accessing a central processor by means of a wearable computer for gaining physical access and financial access as approved by an issuing authority, said method comprising:

a. receiving a user request at a processor remote from said wearable computer for physical access into a secure area or for financial access to purchase goods or services at a terminal;

b. prompting said wearable computer from a prompting processor remote from said wearable computer to submit fingerprint data to gain said physical access into said secure area or said financial access;

c. receiving user sensed fingerprint data submitted from said wearable computer, said receiving occurring in a processing computer remote from said wearable computer, said wearable computer enabling said user to have both hands free for said physical and financial access request except when submitting said fingerprint data, reference fingerprint data having been previously registered to authenticate user identity;

d. comparing said sensed fingerprint data submitted through said wearable computer with said reference fingerprint, said comparing processor being remote from said wearable computer; and e. approving said user request to said physical access if said user is authorized by said issuing authority, authentication of user identity being made at least in part based upon a comparison of said sensed fingerprint data with reference fingerprint data by a processor remote from said wearable computer f. approving said user request for said financial access if said user is authorized by said issuing authority and an account balance has not been exceeded, authentication of user identity being made at least in part based upon a comparison of said sensed fingerprint data with reference fingerprint data by an authorizing processor remote from said wearable computer.

15. The method of claim 14, wherein said wearable computer is an eye-covering, said fingerprint sensor is a sweep sensor, and said issuing authority is a head-of-household.

16. The method of claim 14, further comprising determining if said wearable computer has been authorized for purpose of said user request by said issuing authority prior to prompting said user, said determining being performed in a processing computer remote from said wearable computer.

17. The method of claim 14, wherein said wearable computer is a headset, said fingerprint sensor is a sweep sensor, and said issuing authority is a corporation.

18. The method of claim 14, wherein said wearable computer is a headset, said fingerprint sensor is an area contact sensor, and said issuing authority is a corporation.

19. The method of claim 14, wherein said wearable computer is a headset, said fingerprint sensor is a sweep sensor, and said issuing authority is a head-of-household.

20. The method of claim 14, wherein said wearable computer is a headset, said fingerprint sensor is an area contact sensor, and said issuing authority is a head-of-household.

\* \* \* \* \*